United States Patent [19]
Bridges et al.

[11] Patent Number: 5,450,560
[45] Date of Patent: Sep. 12, 1995

[54] POINTER FOR USE WITH A BUFFER AND METHOD OF OPERATION

[75] Inventors: Jeffrey T. Bridges; Lawrence W. Osborne, both of Austin, Tex.

[73] Assignee: Motorola, Inc., Schaumburg, Ill.

[21] Appl. No.: 994,031

[22] Filed: Dec. 21, 1992

[51] Int. Cl.6 ............................................. G06F 12/06
[52] U.S. Cl. .................... 395/410; 395/250; 395/427; 364/715.1; 364/784; 364/746
[58] Field of Search ............ 364/715.1, 746, 784, 364/200, 787; 395/250, 800, 400, 425

[56] References Cited

U.S. PATENT DOCUMENTS

| | | | |
|---|---|---|---|
| 3,075,701 | 1/1963 | Wilhelmsen | 364/787 |
| 4,800,524 | 1/1989 | Roesgen | 395/400 |
| 4,831,570 | 5/1989 | Abiko | 364/715.01 |
| 4,974,188 | 11/1990 | Dolecek | 364/784 |
| 5,097,436 | 3/1992 | Zurawski | 364/787 |

OTHER PUBLICATIONS

Tanenbaum, Modern Operating Systems, 1992, pp. 83–84.
Waser, Shlomo and Michael J. Flynn, Introduction to Arithmetic for Digital Systems Designers, pp. 83–88.

Primary Examiner—Parshotam S. Lall
Assistant Examiner—Sang Yong Kang
Attorney, Agent, or Firm—Lee E. Chastain

[57] ABSTRACT

A pointer (86) has generate circuitry (90), propagate circuitry (90), carry circuitry (90) and detector circuitry (92). The pointer is for use with a buffer to designate one of a plurality of entries of the buffer. The generate circuitry receives a first and a second data word and generates a plurality of local generate functions. One bit of the first data word, second data word, and one of the local generate functions each corresponds to one of the entries of the buffer. Each data bit of the first data word is representative of the eligibility of the pointer to designate an entry. The second data word is representative of the pointer location at a previous time. The propagate circuitry receives the first and second data words and generates a plurality of local propagate functions. Each local propagate function corresponds to one of the entries of the buffer. The carry circuitry is coupled to the generate circuitry and to the propagate circuitry and generates a plurality of carry bits. Each carry bit corresponds to one of the entries of the buffer. The detector circuitry is coupled to the carry circuitry and detects a predetermined pattern within the plurality of carry bits. The output of the detector circuitry is coupled to the second data word. The pointer may be designed in modules. A modular design procedure makes the pointer easily adapted for applications with different size buffers while maintaining the pointer's high speed performance.

15 Claims, 24 Drawing Sheets

| STATE | D | C | EXCEPTION VECTOR | INSTRUCTION POINTER | REGISTER | HISTORY |
|---|---|---|---|---|---|---|
| 131    126 | 125 | 124 | 123    116 | 115    86 | 85    80 | 79    0 |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |

| R1 | OLDR1 |
|---|---|
| R2 | OLDR2 |
| R3 | OLDR3 |
| R4 | OLDR4 |
| R5 | OLDR5 |
| R6 | OLDR6 |
| IP | IP3 |
| C | C3 |

| STATE | | | EXCEPTION VECTOR | INSTRUCTION POINTER | REGISTER | HISTORY | |
|---|---|---|---|---|---|---|---|
| 131 | 126 D | 125 C | 124 123 | 116 115 | 86 85 | 80 79 | 0 |
| | 0 | C1 | | IP1 | R1 | OLDR1 | |
| | 0 | C2 | | IP2 | R2 | OLDR2 | |

FIG. 4d

| R1 | OLDR1 |
|---|---|
| R2 | OLDR2 |
| R3 | OLDR3 |
| R4 | OLDR4 |
| R5 | OLDR5 |
| R6 | OLDR6 |
| IP | IP4 |
| C | C4 |

| STATE | | | EXCEPTION VECTOR | INSTRUCTION POINTER | REGISTER | HISTORY | |
|---|---|---|---|---|---|---|---|
| 131 | 126 D | 125 C | 124 123 | 116 115 | 86 85 | 80 79 | 0 |
| | 0 | C1 | | IP1 | R1 | OLDR1 | |
| | 0 | C2 | | IP2 | R2 | OLDR2 | |
| | 0 | C3 | | IP3 | R3 | OLDR3 | |

FIG. 4e

| STATE | D | C | EXCEPTION VECTOR | INSTRUCTION POINTER | REGISTER | | HISTORY |
|---|---|---|---|---|---|---|---|
| 131 | 126 | 125 124 | 123 116 | 115 86 | 85 80 | 79 | 0 |
|  | 0 | C1 |  | IP1 | R1 |  | OLDR1 |
|  | 0 | C2 |  | IP2 | R2 |  | OLDR2 |
| EXCEPTION | 0 | C3 | VECTOR1 | IP3 | R3 |  | OLDR3 |
|  | 0 | C4 |  | IP4 | R4 |  | OLDR4 |

| R1 | OLDR1 |
|---|---|
| R2 | OLDR2 |
| R3 | NEWR3 |
| R4 | OLDR4 |
| R5 | OLDR5 |
| R6 | OLDR6 |
| IP | IP5 |
| C | C5 |

FIG. 4f

| STATE | D | C | EXCEPTION VECTOR | INSTRUCTION POINTER | REGISTER | | HISTORY |
|---|---|---|---|---|---|---|---|
| 131 | 126 | 125 124 | 123 116 | 115 86 | 85 80 | 79 | 0 |
| EXCEPTION | 0 | C1 |  | IP1 | R1 |  | OLDR1 |
| EXCEPTION | 0 | C2 | VECTOR1 | IP2 | R2 |  | OLDR2 |
| EXCEPTION | 0 | C3 | VECTOR1 | IP3 | R3 |  | OLDR3 |
|  | 0 | C4 | VECTOR1 | IP4 | R4 |  | OLDR4 |

| R1 | OLDR1 |
|---|---|
| R2 | NEWR2 |
| R3 | NEWR3 |
| R4 | NEWR4 |
| R5 | OLDR5 |
| R6 | OLDR6 |
| IP | IP5 |
| C | C6 |

FIG. 4g

| STATE | D | C | EXCEPTION VECTOR | INSTRUCTION POINTER | REGISTER | HISTORY |
|---|---|---|---|---|---|---|
| 131 | 126 125 | 124 123 | 116 115 | 86 85 | 80 79 | 0 |
| EXCEPTION | 0 | C1 | VECTOR1 | IP1 | R1 | OLDR1 |
| EXCEPTION | 0 | C2 | VECTOR1 | IP2 | R2 | OLDR2 |
| EXCEPTION | 0 | C3 | VECTOR1 | IP3 | R3 | OLDR3 |
| EXCEPTION | 0 | C4 | VECTOR1 | IP4 | R4 | OLDR4 |

|   |   |
|---|---|
| R1 | NEWR1 |
| R2 | NEWR2 |
| R3 | NEWR3 |
| R4 | NEWR4 |
| R5 | OLDR5 |
| R6 | OLDR6 |
| IP | IP5 |
| C | C6 |

FIG. 4h

| STATE | D | C | EXCEPTION VECTOR | INSTRUCTION POINTER | REGISTER | HISTORY |
|---|---|---|---|---|---|---|
| 131 | 126 125 | 124 123 | 116 115 | 86 85 | 80 79 | 0 |
| EXCEPTION | 0 | C1 | VECTOR1 | IP1 | R1 | OLDR1 |
| EXCEPTION | 0 | C2 | VECTOR1 | IP2 | R2 | OLDR2 |
| EXCEPTION | 0 | C3 | VECTOR1 | IP3 | R3 | OLDR3 |
| EXCEPTION | 0 | C4 | VECTOR1 | IP4 | R4 | OLDR4 |

|   |   |
|---|---|
| R1 | OLDR1 |
| R2 | OLDR2 |
| R3 | OLDR3 |
| R4 | OLDR4 |
| R5 | OLDR5 |
| R6 | OLDR6 |
| IP | IP1 |
| C | C1 |

FIG.6c

| STATE | D | C | EXCEPTION VECTOR | INSTRUCTION POINTER | REGISTER | HISTORY |
|---|---|---|---|---|---|---|
| 131 | 126 | 125 124 | 123 116 | 115 86 | 85 80 | 79 0 |
| DONE | 0 | C1 | | IP1 | R1 | OLDR1 |
| | 0 | C2 | | IP2 | R2 | OLDR2 |

| | |
|---|---|
| R1 | NEWR1 |
| R2 | OLDR2 |
| R3 | OLDR3 |
| R4 | OLDR4 |
| R5 | OLDR5 |
| R6 | OLDR6 |
| IP | IP3 |
| C | C3 |

FIG.6d

| STATE | D | C | EXCEPTION VECTOR | INSTRUCTION POINTER | REGISTER | HISTORY |
|---|---|---|---|---|---|---|
| 131 | 126 | 125 124 | 123 116 | 115 86 | 85 80 | 79 0 |
| DONE | 0 | C1 | | IP1 | R1 | OLDR1 |
| | 0 | C2 | | IP2 | R2 | OLDR2 |
| | 0 | C3 | | IP3 | R3 | OLDR3 |

| | |
|---|---|
| R1 | NEWR1 |
| R2 | OLDR2 |
| R3 | OLDR3 |
| R4 | OLDR4 |
| R5 | OLDR5 |
| R6 | OLDR6 |
| IP | IP4 |
| C | C4 |

FIG. 6e

| | R1 | NEWR1 |
|---|---|---|
| | R2 | OLDR2 |
| | R3 | NEWR3 |
| | R4 | OLDR4 |
| | R5 | OLDR5 |
| | R6 | OLDR6 |
| | IP | IP5 |
| | C | C5 |

| STATE 131 | D 126 | C 125 | EXCEPTION VECTOR 124 123 | 116 115 | INSTRUCTION POINTER 86 85 | REGISTER 80 79 | HISTORY 0 |
|---|---|---|---|---|---|---|---|
| DONE | 0 | C1 | | | IP1 | R1 | OLDR1 |
| EXCEPTION | 0 | C2 | | | IP2 | R2 | OLDR2 |
| | 0 | C3 | VECTOR1 | | IP3 | R3 | OLDR3 |
| | 0 | C4 | | | IP4 | R4 | OLDR4 |

FIG. 6f

| | R1 | NEWR1 |
|---|---|---|
| | R2 | NEWR2 |
| | R3 | NEWR3 |
| | R4 | NEWR4 |
| | R5 | OLDR5 |
| | R6 | OLDR6 |
| | IP | IP5 |
| | C | C6 |

| STATE 131 | D 126 | C 125 | EXCEPTION VECTOR 124 123 | 116 115 | INSTRUCTION POINTER 86 85 | REGISTER 80 79 | HISTORY 0 |
|---|---|---|---|---|---|---|---|
| DONE | 0 | C1 | | | IP1 | R1 | OLDR1 |
| DONE | 0 | C2 | | | IP2 | R2 | OLDR2 |
| EXCEPTION | 0 | C3 | VECTOR1 | | IP3 | R3 | OLDR3 |
| EXCEPTION | 0 | C4 | VECTOR1 | | IP4 | R4 | OLDR4 |

FIG.8c

| | R1 | OLDR1 |
| --- | --- | --- |
| | R2 | OLDR2 |
| | R3 | OLDR3 |
| | R4 | OLDR4 |
| | R5 | OLDR5 |
| | R6 | OLDR6 |
| | IP | IP3 |
| | C | C3 |

| STATE 131 | D 126 | C 125 | EXCEPTION VECTOR 124 | 123 | INSTRUCTION POINTER 116 | 115 | REGISTER 86 | 85 | HISTORY 80 | 79 | 0 |
| --- | --- | --- | --- | --- | --- | --- | --- | --- | --- | --- | --- |
| | | C1 | 0 | | IP1 | | R1 | | OLDR1 | | |
| | | C2 | 0 | | IP2 | | R2 | | OLDR2 | | |

FIG.8d

| | R1 | NEWR1 |
| --- | --- | --- |
| | R2 | OLDR2 |
| | R3 | OLDR3 |
| | R4 | OLDR4 |
| | R5 | OLDR5 |
| | R6 | OLDR6 |
| | IP | IP4 |
| | C | C4 |

| STATE 131 | D 126 | C 125 | EXCEPTION VECTOR 124 | 123 | INSTRUCTION POINTER 116 | 115 | REGISTER 86 | 85 | HISTORY 80 | 79 | 0 |
| --- | --- | --- | --- | --- | --- | --- | --- | --- | --- | --- | --- |
| DONE | | C1 | 0 | | IP1 | | R1 | | OLDR1 | | |
| | | C2 | 0 | | IP2 | | R2 | | OLDR2 | | |
| | | C3 | 0 | | IP3 | | R3 | | OLDR3 | | |

FIG. 8e

| STATE | D | C | EXCEPTION VECTOR | INSTRUCTION POINTER | REGISTER | HISTORY |
|---|---|---|---|---|---|---|
| 131 | 126 | 125 | 124 | 123 | 116 | 115 | 86 | 85 | 80 | 79 | 0 |
| DONE | 0 | C1 |  | IP1 | R1 | OLDR1 |
| | 0 | C2 |  | IP2 | R2 | OLDR2 |
| EXCEPTION | 0 | C3 | VECTOR1 | IP3 | R3 | OLDR3 |
| | 0 | C4 |  | IP4 | R4 | OLDR4 |

| | |
|---|---|
| R1 | NEWR1 |
| R2 | OLDR2 |
| R3 | NEWR3 |
| R4 | OLDR4 |
| R5 | OLDR5 |
| R6 | OLDR6 |
| IP | IP5 |
| C | C5 |

FIG. 8f

| STATE | D | C | EXCEPTION VECTOR | INSTRUCTION POINTER | REGISTER | HISTORY |
|---|---|---|---|---|---|---|
| 131 | 126 | 125 | 124 | 123 | 116 | 115 | 86 | 85 | 80 | 79 | 0 |
| DONE | 0 | C1 |  | IP1 | R1 | OLDR1 |
| | 0 | C2 |  | IP2 | R2 | OLDR2 |
| EXCEPTION | 0 | C3 | VECTOR1 | IP3 | R3 | OLDR3 |
| EXCEPTION | 0 | C4 | VECTOR1 | IP4 | R4 | OLDR4 |

| | |
|---|---|
| R1 | NEWR1 |
| R2 | OLDR2 |
| R3 | NEWR4 |
| R4 | NEWR4 |
| R5 | OLDR5 |
| R6 | OLDR6 |
| IP | IP5 |
| C | C6 |

FIG. 8g

| STATE | D | C | EXCEPTION VECTOR | INSTRUCTION POINTER | REGISTER | HISTORY |
|---|---|---|---|---|---|---|
| 131 | 126 | 125 124 | 123 116 | 115 86 | 85 80 | 79 0 |
| DONE | 0 | C1 | | IP1 | R1 | OLDR1 |
| DONE | 0 | C2 | | IP2 | R2 | OLDR2 |
| EXCEPTION | 0 | C3 | VECTOR1 | IP3 | R3 | OLDR3 |
| EXCEPTION | 0 | C4 | VECTOR1 | IP4 | R4 | OLDR4 |

| | | |
|---|---|---|
| R1 | | NEWR1 |
| R2 | | NEWR2 |
| R3 | | NEWR3 |
| R4 | | NEWR4 |
| R5 | | OLDR5 |
| R6 | | OLDR6 |
| IP | | IP5 |
| C | | C6 |

FIG. 8h

| STATE | D | C | EXCEPTION VECTOR | INSTRUCTION POINTER | REGISTER | HISTORY |
|---|---|---|---|---|---|---|
| 131 | 126 | 125 124 | 123 116 | 115 86 | 85 80 | 79 0 |
| DONE | 0 | C1 | | IP1 | R1 | OLDR1 |
| DONE | 0 | C2 | | IP2 | R2 | OLDR2 |
| EXCEPTION | 0 | C3 | VECTOR1 | IP3 | R3 | OLDR3 |
| EXCEPTION | 0 | C4 | VECTOR1 | IP4 | R4 | OLDR4 |

| | | |
|---|---|---|
| R1 | | NEWR1 |
| R2 | | NEWR2 |
| R3 | | OLDR3 |
| R4 | | OLDR4 |
| R5 | | OLDR5 |
| R6 | | OLDR6 |
| IP | | IP3 |
| C | | C3 |

POINTER FOR USE WITH A BUFFER AND METHOD OF OPERATION

RELATED APPLICATION

The present invention is related by subject matter to an application for U.S. Patent entitled "A Data Processor and Method of Operation" filed simultaneously herewith to Osborne et. al. Both the present invention and the Related Application were, at the time the invention was made, subject to an obligation of assignment to the same person.

1. Field of the Invention

The present invention generally relates to digital computing systems, and more specifically to a pointer for use with buffer.

2. Background of the Invention

Modem digital computing systems employ buffers in a wide variety of functions. One use of a buffer in a data processor is as a reorder or history buffer. Such a buffer contains, in each of its entries, information describing the state of the data processor at various times and describing the results of instructions that began executing at the various times. If necessary, control circuitry in the data processor may reconstruct or restore the state of the data processor using the information. It may become necessary to restore the state of the data processor if an instruction causes an exception or if an interrupt is received by the data processor. If not necessary, the control circuitry can simply disregard the information contained in the buffer once certain conditions are met.

A data processor may disregard information stored in a buffer in a number of ways. The data processor may simply never return to use the particular entry again. A one-time scheme is expensive to implement and therefore only practical in specialized applications such as cryptography. A second approach to delete information within a buffer is to load the buffer with a known default value such as zero. This procedure may limit the possible combinations of valid buffer values by excluding the default value. In addition, this second procedure requires a write cycle to clear the entry, a read cycle to periodically determine the contents of the buffer and a compare cycle to finally determine if the entry contains valid data. These three additional steps discourage the use of this method. A third procedure for invalidating data within a buffer is by the use of a head and tail pointer.

The use of a head pointer and tail pointer to invalidate and validate data incorporates the idea of buffer order. A buffer has an order when the buffer is filled in a particular sequence. Typically, a buffer contains N entries which may or may not have an address associated with each entry (N is an integer.). The data processor loads data into the N entries in a known order. The head and tail pointers may be used to describe the first and last valid entries. By implication, all entries between the head and tail pointer entries are valid and all entries outside of the head and tail pointer entries are invalid. Specifically, the head pointer describes the last or most recently entered entry. The tail pointer describes the first or oldest entry.

Head and tail pointers are especially useful with circular buffers. A circular buffer is one in which the head pointer is incremented to the first entry or to the beginning of the buffer after reaching the last entry or the end of the buffer. At this point, the head pointer is behind the tail. Control circuitry typically prevents the head pointer from catching and passing the tail pointer. Such a result would invalidate the buffer's data. Eventually, however, the certain conditions will be met and the tail pointer will advance so it too returns to the beginning of the buffer. The advance of the tail pointer will provide more buffer room for the head pointer.

Head and tail pointers must be compatible with aH the restraints of the digital computing system into which they are integrated. These restraints include speed. Head and tail pointers must be able to increment through multiple buffer locations in a relatively short period of time. It is especially important that the tail pointer be able to increment itself quickly. Typically, the tail pointer increments through several entries in the normal course of its operation. If it is not able to do so quickly, then the system into which the pointer is integrated will perform poorly in the normal course of operation.

SUMMARY OF THE INVENTION

In accordance with the present invention, a pointer has generate circuitry, propagate circuitry, carry circuitry and detector circuitry. The pointer is for use with a buffer and is operable to designate one of a plurality of entries of the buffer responsive to input data and responsive to a prior designated entry. The generate circuitry receives a first and a second data word and generates a plurality of local generate functions. The first and second data words each have a plurality of data bits. One bit of the first data word, one bit of the second data word and one of the local generate functions each corresponds to one of the entries of the buffer. Each data bit of the first data word is representative of the eligibility of the pointer to designate an entry. The second data word is representative of the pointer location at a previous time. The propagate circuitry receives the first and second data words and generates a plurality of local propagate functions. Each local propagate function corresponds to one of the entries of the buffer. The carry circuitry is coupled to the generate circuitry and to the propagate circuitry and generates a plurality of carry bits. Each carry bit corresponds to one of the entries of the buffer. The detector circuitry is coupled to the carry circuitry and detects a predetermined pattern within the plurality of carry bits. The output of the detector circuitry is coupled to the second data word.

In addition, a method of incrementing a pointer has the steps of generating a plurality of local generate functions, generating a plurality of local propagate functions, generating a plurality of carry bits, and detecting a predetermined pattern within the plurality of carry bits. The pointer designates one of a plurality of entries of a buffer. Each entry has a first data bit associated with the entry representative of the eligibility of the associated entry to be designated. The step of generating a plurality of local generate functions receives two inputs. The first input is coupled to the first data bits. The second input is coupled to the second input bits. The second input bits are representative of the pointer location at a previous time Each local generate function corresponds to one of the entries of the buffer. The step of generating a plurality of local propagate functions receives two inputs. The first input is coupled to the first data bits. The second input is coupled to the second input bits. Each local propagate function corresponds to one of the entries of the buffer. The step of generating a plurality of carry bits receives the local generate functions, the local propagate functions and an input carry bit. Each carry bit corresponds to one of the entries of the buffer.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which:

FIG. 2 depicts a block diagram of the history buffer depicted in FIG.

FIGS. 4a through 4h each depict a block diagram of the contents of the history buffer, the contents of general registers R1 through R6 and the contents of the instruction pointer ("IP") and carry bit ("C") registers at various times corresponding to regular intervals depicted in FIG. 3;

FIGS. 6a through 6g each depict a block diagram of the contents of the history buffer, the contents of general registers R1 through R6 and the contents of the instruction pointer ("IP") and carry bit ("C") registers at various times corresponding to regular intervals depicted in FIG. 5;

FIGS. 8a through 8h each depict a block diagram of the contents of the history buffer, the contents of general registers R1 through R6 and the contents of the instruction pointer ("IP") and carry bit ("C") registers at various times corresponding to regular intervals depicted in FIG. 7;

DETAILED DESCRIPTION OF A PREFERRED EMBODIMENT

The present invention describes a pointer for use with a buffer where high speed performance is critical. The disclosed invention is described below in connection with one specific example, a history or reorder buffer. The disclosed invention is described in connection with the following outline:

I. History Buffer
  A. Introduction
  B. Buffer
  C. Operating Examples
    1. Introduction
    2. Example 1, All Normal Instructions
      a. Interrupts
      b. Exceptions and Incorrectly Predicted Conditions Precedent
    3. Example 2, LOAD Instructions
      a. Interrupts
      b. Exceptions and Incorrectly Predicted Conditions Precedent
    4. Example 3, STORE Instructions
      a. Interrupts
      b. Exceptions and Incorrectly Predicted Conditions Precedent
  D. History Buffer Operation
II. Buffer Pointer
  A. Introduction
  B. Circuit Implementation
    1. Logic Units
    2. Adder
      a. Mathematical Operation
      b. Modularity
      c. Four-Bit Adder Cells
      d. Generator
    3. Detector
  C. Buffer Pointer Operation
III. Concluding Remarks The outline headings appearing immediately above and throughout this Detailed Description of a Preferred Embodiment are inserted only as a matter of convenience and in no way should be used to define the scope of the disclosed invention.

I. HISTORY BUFFER

A. Introduction

Figure 1:
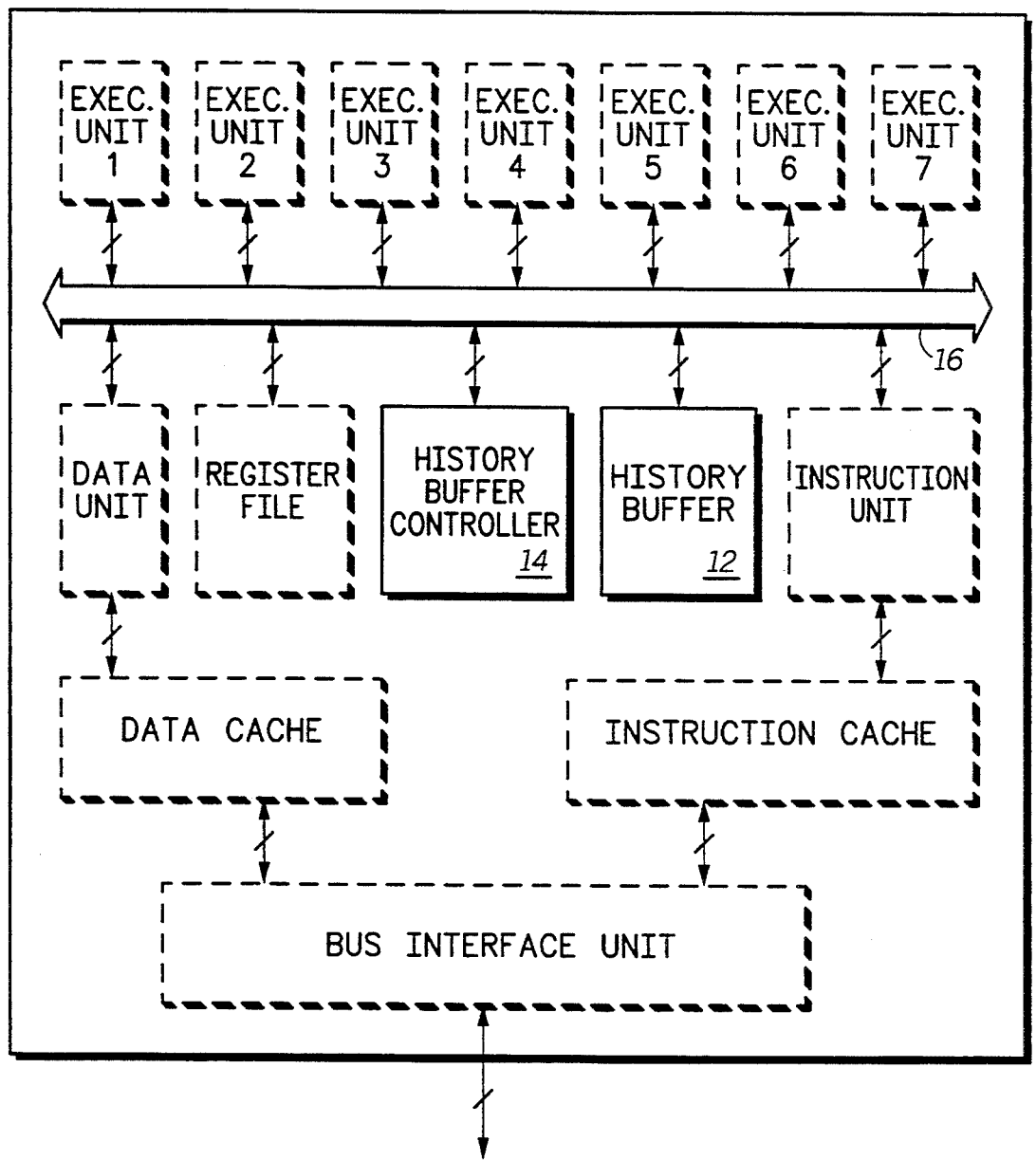
FIG. 1 depicts a block diagram of a data processor.

FIG. 1 depicts a block diagram of a data processor 10 constructed in accordance with the disclosed invention.. Data processor 10 comprises a history buffer 12, a history buffer controller 14 and an intermodule bus 16 (the latter two hereinafter simply "controller 14" and "bus 16" respectively). As depicted, history buffer 12 and controller 14 communicate directly with one another and to other modules within data processor 10 through bus 16. History buffer 12 is a circular first-in-first-out ("FIFO") buffer in which controller 14 stores data necessary to the operation of controller 14.

It should be readily understood that FIG. 1 depicts a highly simplified and only partial data processor 10. Data processor 10 typically has multiple execution units, a data unit, a register file, an instruction unit, data and instruction caches and a bus interface unit. The operation of these modules is known in the art.

In operation, data processor 10 achieves high throughput by issuing instructions to multiple execution units and by implementing pipe lining and speculative execution schemes. As will be described below, data processor 10 is a precise :machine. This simplifies programming of associated operating systems and application programs. In addition, data processor 10 does not have to wait until all issued instructions have completed before it resolves an exception, incorrectly predicted condition precedent, or interrupt. Instead, data processor 10 only waits until the entry at the top of history buffer 12 contains a flag indicating an exception, incorrectly predicted condition precedent or interrupt. An instruction rises to the top of history buffer 12 when all preceding instructions have executed successfully.

In the case of an exception or incorrectly predicted condition precedent, a single error flag is associated with the instruction that generated the exception or incorrectly predicted condition precedent. When this instruction rises to the top of history buffer 12, controller 14 restores the state of data processor 10 to the state existing immediately before the same instruction issued.

In the case of an interrupt, controller 14 assigns an error flag to each instruction that completes while the interrupt is asserted. When the first instruction with an interrupt error flag rises to the top of history buffer 12, controller 14 restores the state of data processor 10 to the state existing immediately before the same instruction issued.

The way in which controller 14 treats instructions that modify external registers allows the described method of operation. This type of instruction includes, but is not limited to, memory store instructions, and memory load instructions. The disclosed method maintains a precise state without the delay associated with known precise machines.

Although data processor 10 issues instructions in a normal program order, a first instruction that takes longer to complete may finish after a second later issued but shorter instruction. Complications arise if either of these instructions causes an exception, if either has an incorrectly predicted condition precedent, or if an interrupt is attributed to either instruction. These events may be generally referred to as an "exception condition." For instance, the second instruction executed by data processor 10 may alter the state of data processor 10 before an exception generated by the first instruction is detected. Conversely, the second issued shorter instruction may generate the error and report it before the first instruction completes. In the first case, the second instruction alters the state of data processor when it should not if data processor 10 is to be a precise machine. In the second case, the first instruction has yet to alter the state of data processor 10 as needed if data processor 10 is to be a precise machine.

An instruction alters the state of data processor 10 by changing the contents of registers. As is known in the art, the contents of registers of a data processor may represent instructions, data, flow control information, etc. These registers may be internal or external to data processor 10. If these registers are internal to data processor 10, then their "contents" may be restored if necessary by simply writing a previously recorded value to them. If these registers are external to data processor 10, then, in many cases, their "contents" may not be restored, simply or otherwise. For instance, some load instructions cause the register from which they are loading to change their data. Keyboards operate in such a manner. Once a keyboard value is loaded into the data processor, the related keyboard will destroy the value by discarding it. Similarly, certain memory write commands actually instruct a peripheral, such as a disk drive, to perform a particular function, such as "move drive head to . . . " This memory write instruction can not be undone.

History buffer 12 and controller 14 cause data processor 10 to be a precise machine. Buffer 14 has three broad functions. First, buffer 14 monitors the status of data processor 10 each time data processor 10 issues an instruction and each time an instruction writes back its result. Second, buffer 14 records the status of data processor 10 and certain information about a particular instruction in history buffer 12 before each particular instruction issues. Buffer 14 also records the success or failure of each instruction after the instruction writes back its result. Third, controller 14 controls which instructions data processor 10 processes according to the type of each instruction, to the status of data processor 10 before each instruction issues and according to the contents of history buffer 12. These functions are described more fully below.

B. Buffer

FIG. 2 depicts a block diagram of history buffer 12 depicted in FIG. 1. In the illustrated embodiment, history buffer 12 contains twelve entries of 132 bits each. Each entry corresponds to data regarding a single instruction and is split into seven fields: history field (80 bits), register field (6 bits), instruction pointer field (30 bits), exception vector field (8 bits), carry bit field (labeled "C", 1 bit), delay slot field (labeled "D", 1 bit) and state field (6 bits). As data processor 10 issues each instruction, controller 14 enters certain data in the next available entry of history buffer 12. This data describes the instruction and the status of data processor 10 at that time. Controller 14 enters additional data into history buffer 12 after each instruction writes back or completes executing. Although each instruction issues in a normal program order, each instruction may write back out of order. Controller 14 always associates write back data with the entry corresponding to the instruction that generated the data. As described above, controller 14 also monitors the data in history buffer 12 from time to time.

History buffer 12 has associated with it two pointers that indicate which entry in history buffer 12 should be filled in next by controller 14 and which entry contains the oldest valid data. These pointers are called the "head pointer" and "tail pointer," respectively.

The history field, in conjunction with the carry bit field and the instruction pointer below, describes the status of data processor 10 before data processor 10 issues the corresponding instruction. This field need only contain the preexisting value of the register that the corresponding instruction will change in order to completely describe the status of data processor 10 as it exists before the corresponding instruction issues. Controller 14 enters data into this field when the corresponding instruction issues.

The register field identifies the destination register that the corresponding instruction will modify. Controller 14 enters data into this field when the corresponding instruction issues.

The instruction pointer field contains the value of the instruction pointer when the corresponding instruction issues. Controller 14 enters data into this field when the corresponding instruction issues.

The exception vector field may contain up to two pieces of information about an instruction. First, the particular execution unit that executes an instruction will provide an address or part of an address where an exception handling routine resides in memory if the associated instruction causes an exception or an incorrectly predicted condition precedent. This field will also contain the same subroutine address data if an interrupt is asserted while the associated instruction is executing. In the case of an interrupt, this subroutine address data will be provided by other parts of data processor 10. The exception routine will allow data processor 10 to account for the exception, incorrectly predicted condition precedent or interrupt in a controlled manner. Second, this field may also contain information about the specific cause of the exception if the execution unit that generates it is capable of generating an exception for multiple reasons. A floating point execution unit, for instance, generates an interrupt due to data under flow, data overflow and divide-by-zero conditions. Controller 14 enters data into this field when the corresponding instruction writes back. If an instruction does not generate an exception, incorrectly predicted condition precedent or interrupt, then data processor 10 ignores this field.

The carry bit field contains the carry bit of data processor 10 before the corresponding instruction issues. Controller 14 enters data into this field when the corresponding instruction issues.

The delay bit field indicates that data processor 10 issued the corresponding instruction in a delay slot. An instruction issued in a delay slot immediately executes after a branch instruction. Normally, no instruction is issued for one clock cycle following a branch instruction. Controller 14 enters data into this field when the corresponding instruction issues.

The state field describes the status of each instruction corresponding to the history buffer entry. There are six state field flags in the illustrated embodiment:

CONDITIONAL indicates that the corresponding instruction was speculatively executed, i.e. an earlier conditional branch instruction was unresolved when the instruction was issued. Controller 14 enters this flag into the state field when the corresponding instruction issues.

DONE indicates that the corresponding instruction is complete, i.e. has modified the destination register, the carry bit or the instruction pointer. Controller 14 enters this flag into the state field when the corresponding instruction writes back.

EXCEPTION indicates that the corresponding instruction has caused an exception or incorrectly predicted condition precedent or that an interrupt was asserted while the instruction was executing. Controller 14 enters this flag into the state field when the corresponding instruction writes back.

FINX indicates that the floating point result of the corresponding instruction can not be accurately represented. Controller 14 enters this flag into the state field when the corresponding instruction writes back.

STORE indicates that the corresponding instruction is a store instruction. Controller 14 enters this flag into the state field when data processor 10 decodes the corresponding instruction. The purpose of this flag is more fully described in connection with steps 54 and 58 depicted in FIG. 9.

STOREGONE indicates that the corresponding instruction, a store instruction, has begun executing. Controller 14 enters this flag into the state field when the corresponding instruction issues. The purpose of this flag is more fully described in connection with steps 54 and 58 depicted in FIG. 9.

As described above, data processor 10 is a precise machine but does not wait until all executing instructions complete before resolving an exception, an incorrectly predicted condition precedent or an interrupt. Instead, data processor 10 only waits until a certain instruction is at the top of history buffer 12. The certain instruction is the instruction that generates the exception or the incorrectly predicted condition precedent or is the first instruction to rise to the top of history buffer 12 that completes while an interrupt is asserted. This timing difference results in a data processor that is more responsive to exceptions, incorrectly predicted condition precedents and interrupts. The disclosed invention is accomplished in part by dividing the instruction set of data processor 10 into two groups. The first group is made up of instructions that only modify registers internal to data processor 10. The results of this first group of instructions may be undone if necessary by loading a previously saved value into the affected register. The second group of instructions is made up of instructions that modify registers external to data processor 10. These registers may cause changes both directly and indirectly that cannot be undone. In the disclosed embodiment the LOAD and STORE instructions are the members of the second group.

C. Operating Examples

1. Introduction

Figure 3:
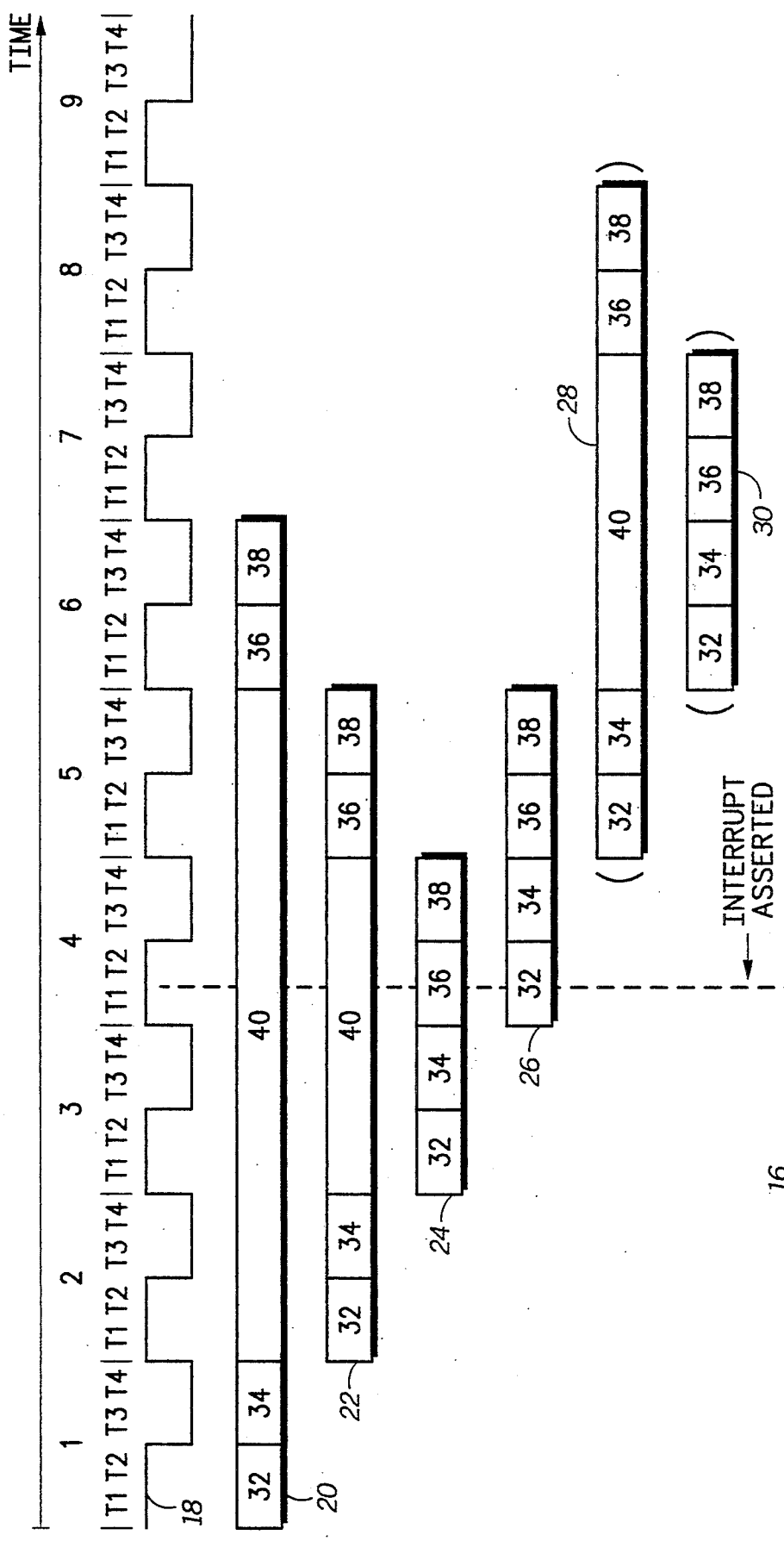
FIG. 3 depicts a first timing diagram of the data processor depicted in FIG. 1.
Figure 4A:
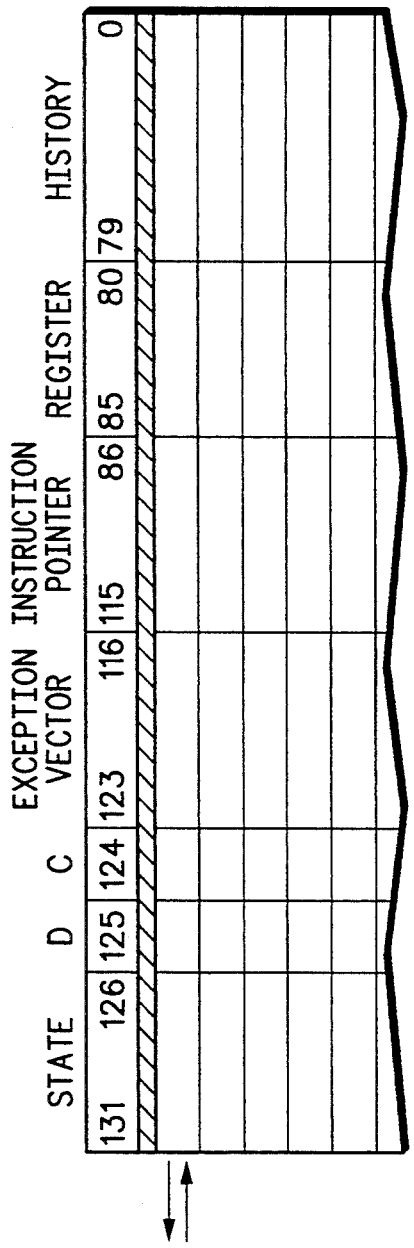
Figure 4B:
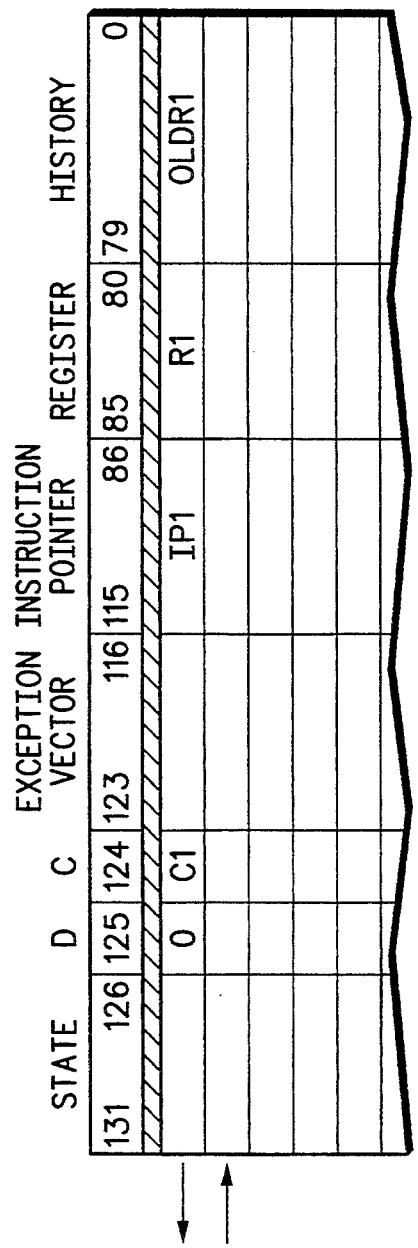
Figure 5:
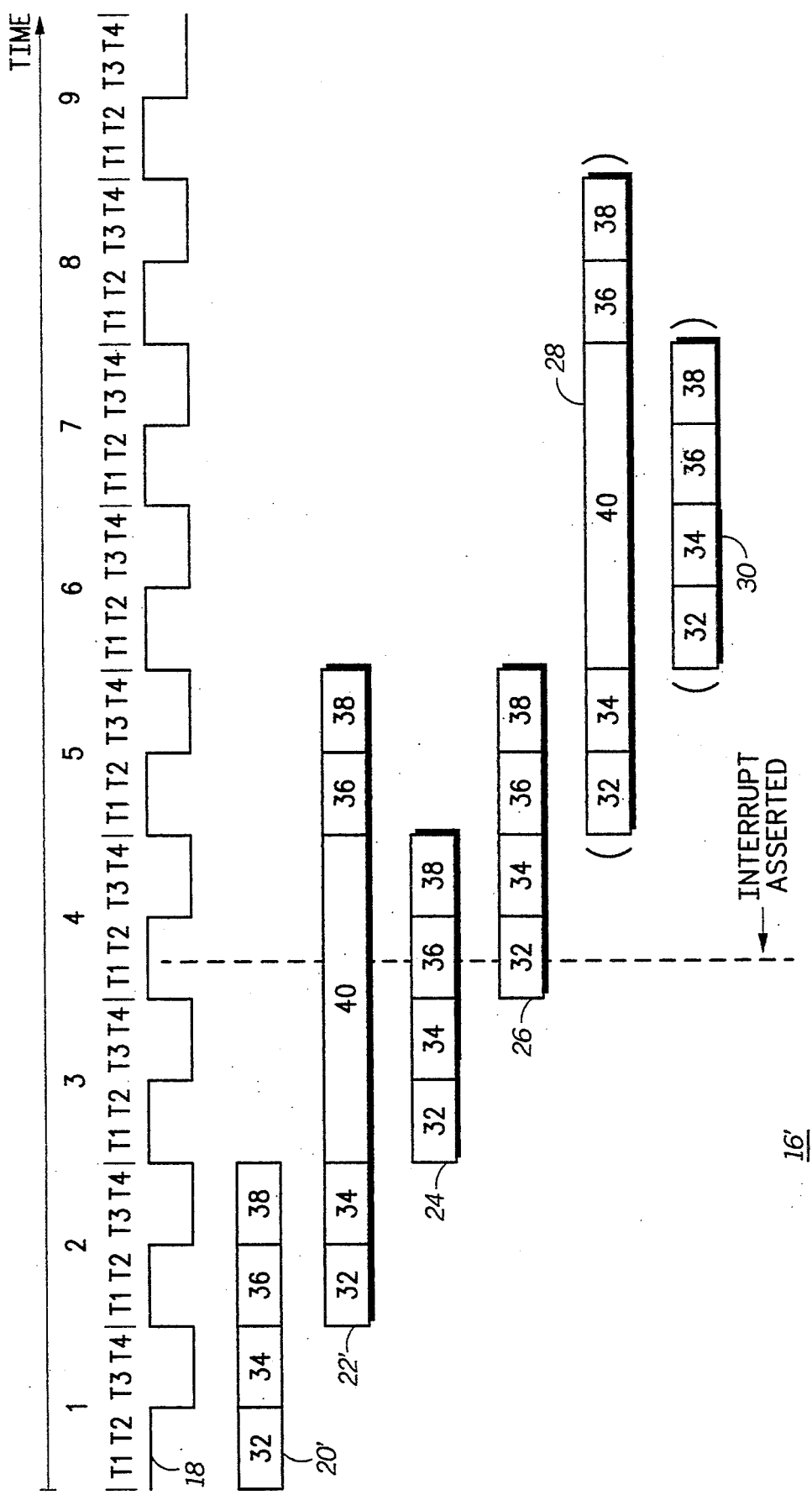
FIG. 5 depicts a second timing diagram of the data processor depicted in FIG. 1.
Figure 6A:
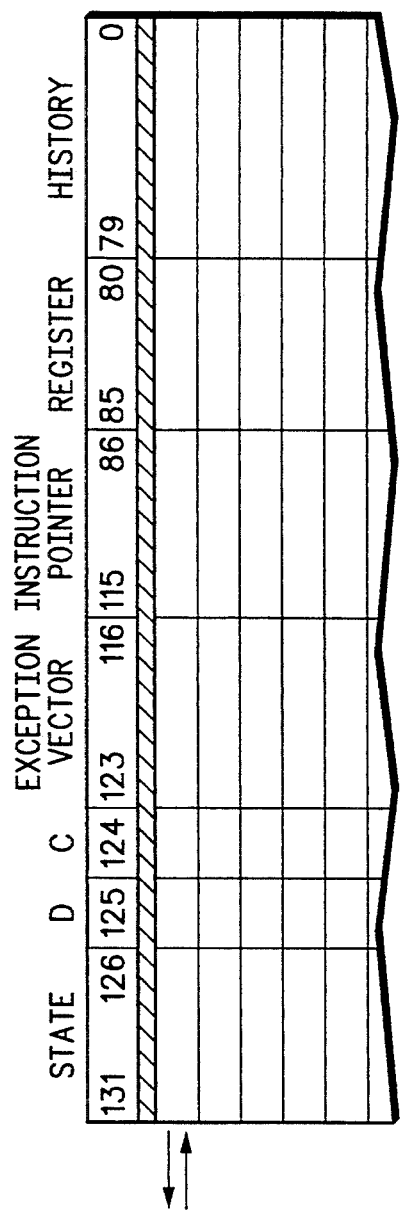
Figure 6B:
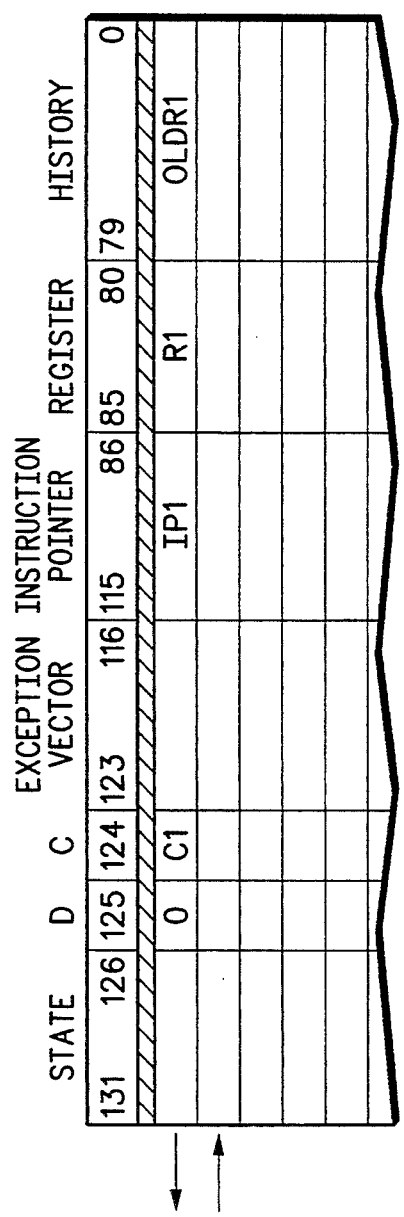
Figure 6G:
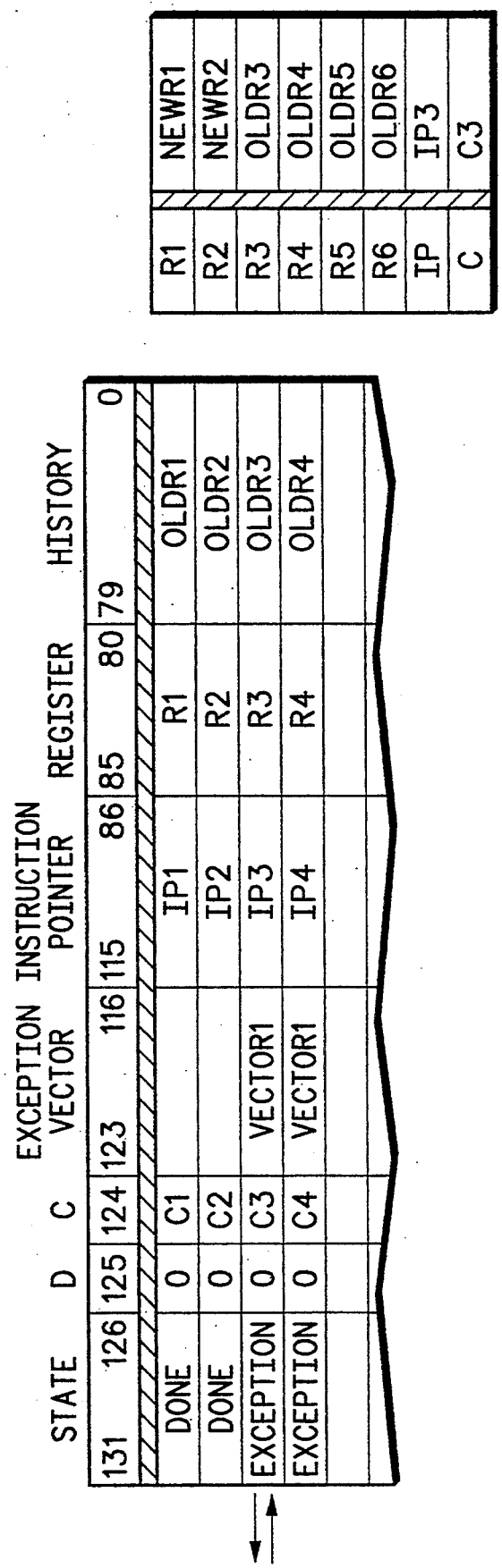
Figure 7:
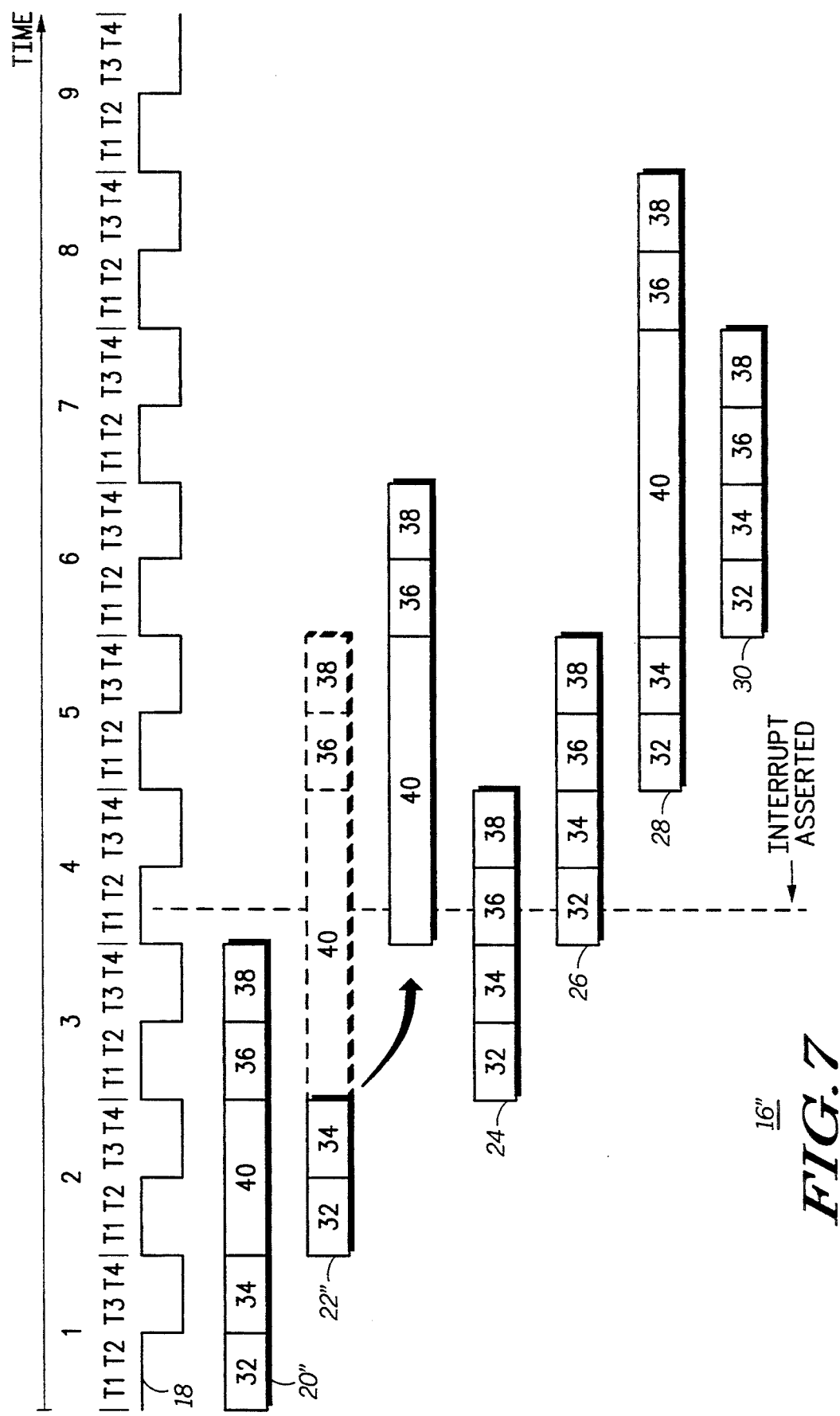
FIG. 7 depicts a third timing diagram of the data processor depicted in FIG. 1.

FIGS. 3 through 8*h* depict three illustrative examples of data processor 10. FIGS. 3 through 4*h* depict the operation of data processor 10 wherein all instructions modify only registers internal to data processor 10. All instructions depicted in FIGS. 3 through 4*h* are members of the first group described above. FIGS. 5 through 6*g* depict the operation of data processor 10 wherein a first instruction modifies an external register to data processor 10. In particular, the first instruction is a LOAD instruction. FIGS. 7 through 8*h* depict the operation of data processor 10 wherein a second instruction modifies an external register to data processor 10. In particular, the second instruction is a STORE instruction.

2. Example 1, All Normal Instructions a. Interrupts

FIG. 3 depicts a timing diagram 16 of data processor 10 depicted in FIG. 1. Timing diagram 16 depicts a clocking signal 18 and six exemplary instructions 20, 22, 24, 26, 28 and 30. None of the depicted instructions modify a register external to data processor 10. As depicted an interrupt is asserted during the first half of the fourth clock cycle. A portion of data processor 10 will generate an interrupt vector, VECTOR1, when this interrupt is asserted. The horizontal axis of timing diagram 16 depicts the variable time. Time may be conveniently measured in whole or one-quarter clock cycles. One-quarter clock cycles are called "ticks" or T1, T2, T3 and T4. The vertical axis does not describe any variable but does depict how the execution of various instructions overlap in time, i.e. data processor 10 simultaneously executes instructions that are partially above or below each other.

Each instruction may be divided into at least four parts: a decode phase 32, an issue phase 34, a write back phase 36 and an update phase 38. Each of these four phases is two ticks or one-half clock cycle in length. Each decode phase occurs during T1 and T2 of the clock cycle in which the particular instruction begins. Similarly, issue phase 34 occurs during T3 and T4 of the clock cycle in which the particular instruction begins. The occurrence of write back phase 36 and update phase 38 varies depending upon the length of the particular instruction. These two phases occur during the last clock cycle of the instruction, whenever that cycle occurs. A simple instruction such as an add takes two clock cycles to fully execute. Instructions 26 and 30 are examples of these types of instructions. Write back phase 36 and update phase 38 therefore occur during T1–T2 and T3–T4 of the instruction's second clock cycle, respectively. A more complex instruction, such as a multiply instruction, takes longer to execute. Multiply instructions, for instance, may take four clock cycles to execute. Instruction 22 is an example of this type of instruction. Write back phase 36 and update phase 38 therefore occur during T1-T2 and T3-T4 of the instruction's fourth clock cycle, respectively. These latter, more lengthy, instructions have a fifth phase 40, unnamed, during which the appropriate execution unit operates. The appropriate execution unit may be pipe lining the instruction through sequential sub-units of itself, may be iterating a single instruction or may be accessing other devices through input/output ports during this fifth phase. The fifth phase is significantly longer than depicted in some instructions.

As a first hypothetical example, data processor 10 is programmed to execute the six instructions depicted in FIG. 3. Several assumptions are made to simply the example and to highlight the disclosed invention. First, the particular six instructions will not occupy the same non-pipelined execution units simultaneously nor will they have any impermissible data dependencies. This allows the six instructions to execute as depicted barring an interrupt, exception or incorrect speculative instruction. Second, the history buffer is initially empty. Therefore, the first entry of history buffer 12 will contain data relating to the first instruction, instruction 20, the second entry of history buffer 12 will contain . information relating to the second instruction, instruction 22, etc. Third, the six instructions will alter six registers, R1 through R6, where the first instruction will alter R1, the second instruction will alter R2, etc. Fourth, the original and altered value of a register RN is OLDRN and will be NEWRN, respectively, where N equals the instruction or register number. Fifth, the address of the Nth instruction is IPN. Sixth, the value of the carry bit immediately before the Nth clock cycle will be CN. Finally, none of the six instructions will be issued in a delay slot. Consequently, the delay field for each instruction will be a logic zero. As will be described below, the last two depicted instructions, instructions 28 and 30, will not be executed because of the asserted interrupt. Instructions 28 and 30 are therefore depicted in parenthesis.

Although data processor 10 issues one instruction per clock cycle, the present invention may be advantageously incorporated into data processors that issue more than one instruction per clock cycle (referred to as "Superscalar" processors).

Each of FIGS. 4a through 4h depicts a block diagram of the contents of history buffer 12, of the head and tail pointers, of general registers R1 through R6 and of the instruction pointer ("IP") and carry bit ("C") registers at various times depicted in FIG. 3. The contents of the head and tail pointers are graphically represented by an arrow pointing to the entry corresponding to the youngest entry ("→") and away from the entry corresponding to the oldest entry ("←"), respectively.

FIG. 4a depicts a block diagram of the contents of history buffer 12, of the head and tail pointers, of general registers R1 through R6 and of the instruction pointer ("IP") and carry bit ("C") registers at a time corresponding to the beginning, or far left-hand side, of FIG. 3. As described above, history buffer 12 is initially empty, general registers R1 through R6 contain the values OLDR1 through OLDR6, respectively, and the instruction pointer and carry bit registers contain the values IP1 and C1, respectively. An inward arrow indicates that controller 14 will enter data into the first entry of history buffer 12, the next available entry. An outward arrow at the same entry indicates that no data in history buffer 12 is valid. For purposes of illustration, all fields in history buffer 12 are blank. In actual practice, the fields of history buffer 12 may contain invalid data from previous operations.

FIRST CLOCK CYCLE

During T1/T2 of the first clock cycle, data processor 10 decodes instruction 20. Controller 14 also reviews the state field of the oldest instruction, instruction 20. Controller 14 takes no action at this time because the oldest instruction is unfinished.

During T3/T4 of the first clock cycle, data processor 10 issues instruction 20. Controller 14 enters data into the first entry of history buffer 12 describing instruction 20 and the status of data processor 10 at the beginning of the first clock cycle.

FIG. 4b depicts a block diagram of the contents of history buffer 12, of the head and tail pointers, of general registers R1 through R6 and of the instruction pointer ("IP") and carry bit ("C") registers at a time corresponding to the end of the first clock cycle depicted in FIG. 3. The first entry of history buffer 12 now contains the values depicted, in the fields depicted, that describe the status of data processor 10 immediately before data processor 10 issued instruction 20. General registers R1 through R6 contain the values OLDR1 through OLDR6, respectively. The instruction pointer and carry bit registers now contain the values IP2 and C2, respectively, reflecting that data processor 10 has incremented the instruction pointer and that the carry bit register may have been modified by the previous steps. An inward arrow indicates that controller 14 will enter data into the second entry of history buffer 12, the next available entry. An outward arrow adjacent the first entry indicates that controller 14 did not retire any instructions in the first clock cycle. Instruction 20 is therefore the oldest instruction.

SECOND CLOCK CYCLE

During T1/T2 of the second clock cycle, data processor 10 decodes instruction 22. Controller 14 also reviews the state field of the oldest instruction, instruction 20. Controller 14 takes no action at this time because the oldest instruction is unfinished.

During T3/T4 of the second clock cycle, data processor 10 issues instruction 22. Controller 14 enters data into the second entry of history buffer 12 describing instruction 22 and the status of data processor 10 at the beginning of the second clock cycle and as depicted in FIG. 4b.

FIG. 4c depicts a block diagram of the contents of history buffer 12, of the head and tail pointers, of general registers R1 through R6 and of the instruction pointer ("IP") and carry bit ("C") registers at a time corresponding to the end of the second clock cycle depicted in FIG. 3. The second entry of history buffer 12 now contains the values depicted, in the fields depicted, that describe the status of data processor 10 immediately before data processor 10 issued instruction 22. General registers R1 through R6 contain the values OLDR1 through OLDR6, respectively. The instruction pointer and carry bit registers now contain the values IP3 and C3, respectively, reflecting that data processor 10 has incremented the instruction pointer and that the carry bit register may have been modified by the previous steps. An inward arrow indicates that controller 14 will enter data into the third entry of history buffer 12, the next available entry. An outward arrow adjacent the first entry indicates that controller 14 did not retire any instructions in the second clock cycle.

THIRD CLOCK CYCLE

During T1/T2 of the third clock cycle, data processor 10 decodes instruction 24. Controller 14 also reviews the state field of the oldest instruction, instruction 20. Controller 14 takes no action at this time because the oldest instruction is unfinished.

During T3/T4 of the third clock cycle, data processor 10 issues instruction 24. Controller 14 enters data into the third entry of history buffer 12 describing instruction 24 and the status of data processor 10 at the beginning of the third clock cycle and as depicted in FIG. 4c.

FIG. 4d depicts a block diagram of the contents of history buffer 12, of the head and tail pointers, of general registers R1 through R6 and of the instruction pointer ("IP") and carry bit ("C") registers at a time corresponding to the end of the third clock cycle depicted in FIG. 3. The third entry of history buffer 12 now contains the values depicted, in the fields depicted, that describe the status of data processor 10 immediately before data processor 10 issued instruction 24. General registers R1 through R6 contain the values OLDR1 through OLDR6, respectively. The instruction pointer and carry bit registers contain the values IP4 and C4, respectively, reflecting that data processor 10 has incremented the instruction pointer and that the carry bit register may have been modified by the previous steps. An inward arrow indicates that controller 14 will enter data into the fourth entry of history buffer 12, the next available entry. An outward arrow adjacent the first entry indicates that controller 14 did not retire any instructions in the third clock cycle.

FOURTH CLOCK CYCLE

During T1/T2 of the fourth clock cycle, data processor 10 decodes instruction 26. Instruction 24 completes and the appropriate execution unit writes back the result to register R3. Controller 14 reviews the state field of the oldest instruction, instruction 20. Controller 14 takes no action at this time because the oldest instruction is unfinished. In addition, an interrupt is asserted.

During T3/T4 of the fourth clock cycle, data processor 10 issues instruction 26. Controller 14 enters data into the fourth entry of history buffer 12 describing instruction 26 and the status of data processor 10 at the beginning of the fourth clock cycle and as depicted in FIG. 4d. Controller 14 loads an EXCEPTION flag into the state field of the third entry of history buffer 12 indicating that an interrupt was asserted while instruction 24 was executing. Controller 14 also loads the exception vector field of the third entry with "VECTOR 1."

FIG. 4e depicts a block diagram of the contents of history buffer 12, of the head and tail pointers, of general registers R1 through R6 and of the instruction pointer ("IP") and carry bit ("C") registers at a time corresponding to the end of the fourth clock cycle depicted in FIG. 3. The fourth entry of history buffer 12 now contains the values depicted, in the fields depicted, that describe the status of data processor 10 immediately before data processor 10 issued instruction 26. General registers R1, R2 and R4 through R6 contain the values OLDR1, OLDR2 and OLDR4 through OLDR6, respectively. General register R3 contains the value NEWR3. The instruction pointer and carry bit registers now contain the values IP5 and C5, respectively, reflecting that data processor 10 has incremented the instruction pointer and that the carry bit register may have been modified by the previous steps. An inward arrow indicates that controller 14 will enter data into the fifth entry of history buffer 12, the next available entry. An outward arrow adjacent the first entry indicates that controller 14 did not retire any instructions in the fourth clock cycle.

FIFTH CLOCK CYCLE

During T1/T2 of the fifth clock cycle, data processor 10 does not decode another instruction because of the outstanding interrupt. Instructions 22 and 26 complete and the appropriate execution units write back the results, NEWR2 and NEWR4, to registers R2 and R4, respectively. Controller 14 also reviews the state field of the oldest instruction, instruction 20. Controller 14 takes no action at this time because the oldest instruction is unfinished.

During T3/T4 of the fifth clock cycle, controller 14 loads an EXCEPTION flag into the state field of the second and fourth entries of history buffer 12 indicating that an interrupt was asserted while these instructions were executing. Controller 14 also loads the exception vector field of the third and fifth entry with "VECTOR1."

FIG. 4f depicts a block diagram of the contents of history buffer 12, of the head and tail pointers, of general registers R1 through R6 and of the instruction pointer ("IP") and carry bit ("C") registers at a time corresponding to the end of the fifth clock cycle depicted in FIG. 3. General registers R2, R3 and R4 contain the values NEWR2, NEWR3 and NEWR4, respectively. General registers R1, R5 and R6 contain the values OLDR1, OLDR5 and OLDR6, respectively. The instruction pointer and carry bit registers contain the values IP5 and C6, respectively, reflecting that data processor 10 did not increment the instruction pointer but that the carry bit register may have been modified by the previous steps. An inward arrow indicates that controller 14 will enter data into the fifth entry of history buffer 12, the next available entry. An outward arrow adjacent the first entry indicates that controller 14 did not retire any instructions in the fifth clock cycle.

SIXTH CLOCK CYCLE

During T1/T2 of the fifth clock cycle, data processor 10 does not decode another instruction because of the outstanding interrupt. Instruction 20 completes and the appropriate execution unit writes back the result, NEWR1 to register R1. Controller 14 also reviews the state field of the oldest instruction, instruction 20. Controller 14 takes no action at this time because the oldest instruction, though complete, has an interrupt associated with it.

FIG. 4g depicts a block diagram of the contents of history buffer 12, of the head and tail pointers, of general registers R1 through R6 and of the instruction pointer ("IP") and carry bit ("C") registers at a time corresponding to the end of T1/T2 of the sixth clock cycle depicted in FIG. 3. General registers R1 through R4 contain the values NEWR1 through NEWR4, respectively. Registers R5 and R6 contain the values OLDR5 and OLDR6, respectively. The instruction pointer and carry bit registers contain the values IP5 and C6, respectively. An inward arrow indicates that controller 14 will enter data into the fifth entry of history buffer 12, the next available entry. An outward arrow adjacent the first entry indicates that controller 14 did not retire any instructions in the first half of the sixth clock cycle.

Before data processor 10 branches to the exception routine identified by the exception vector field, "VECTOR1," controller 14 "deletes" instruction 20 and each issued instruction after instruction 20. Instruction 20 is the first instruction in the depicted instruction stream that has an interrupt associated with it. Instruction 26 is the last issued instruction. Controller 14 deletes instructions 20 through 26 by loading the contents of the carry bit field, the instruction pointer field and the history field of instruction 26 into the carry bit, into the instruction pointer and into the register specified by the register field, respectively. Data processor 10 then decrements the head pointer one entry to the fourth entry position. Data processor 10 deletes the third instruction by loading the same fields into the corresponding registers. The pointer and carry bit ultimately will contain the values corresponding to the "oldest" deleted instruction. Data processor 10 continues this procedure until the head pointer points to the tail pointer, or instruction 20. Data processor 10 then appears as if it completed all instructions that completed before the interrupt was asserted and as if it started none of the subsequent instructions. Data processor 10 therefore appears as a precise machine to the programmer.

FIG. 4h depicts a block diagram of the contents of history buffer 12, of the head and tail pointers, of general registers R1 through R6 and of the instruction pointer ("IP") and carry bit ("C") registers at a time after data processor 10 has restored its state as described above. All instructions have either been retired or deleted (None were retired in this first example.). History buffer 12 is now "empty," i.e. the head and tail pointers point to the same entry in history buffer 12. General registers R1 through R6 contain the values OLDR1 through OLDR6, respectively. The instruction pointer and carry bit registers contain the values IP1 and C1, respectively. Data processor 10 will branch to an error correcting subroutine indicated by the contents of the exception vector of the first entry, "VECTOR1."

b. Exceptions and Incorrectly Predicted Conditions Precedent

The operation of controller 14 and history buffer 12 is analogous to the interrupt process described above when the error signal is an exception or an incorrectly predicted condition precedent. In either case, controller 14 assigns the EXCEPTION state flag and the exception vector field only to the one instruction generating the flag. When that instruction rises to the top of history buffer 12, then controller 14 deletes all instructions that were issued after that instruction. An instruction rises to the top of history buffer 12 when all older instructions complete successfully and are "retired" by controller 14. The process of "retiring" an instruction is more fully described below in connection with FIG. 6c.

3. Example 2, LOAD Instructions
 a. Interrupts

FIG. 5 depicts a second timing diagram 16' of data processor 10 depicted in FIG. 1. Timing diagram 16' depicts a clocking signal 18 and six exemplary instructions 20', 22', 24, 26, 28 and 30. Instruction 22' is a LOAD instruction and therefore modifies a register external to data processor 10. Instruction 20 has been modified by shortening its length to more clearly highlight the disclosed invention. Instruction 20 therefore is labeled 20' in FIG. 5. FIG. 5 is otherwise identical to FIG. 3. In addition, FIGS. 6a through 6g depict the same variables as depicted in FIGS. 4a through 4h.

In this second hypothetical example, data processor 10 operates and is programmed according to the same assumptions and conventions as described in connection with FIG. 3. Data processor 10, however, will not assign an EXCEPTION state field to an instruction that modifies an external register. As described above, such an instruction cannot be reversed if necessary because of an exception, incorrectly predicted condition precedent or interrupt.

In the preferred embodiment, not all LOAD instructions modify an external register when they read the external register. Some LOAD instructions simply copy the contents of an external register to a destination register. Whether the LOAD instruction actually modifies the contents of the external register is determined by the operation of each external register. Under certain circumstances a LOAD instruction will be undone within the data processor; i.e. the original contents of the destination register will be loaded back into the destination register. The affect, if any, of the instruction upon the contents of the external register cannot be undone. Example 3 below describes a method of operation where it is desired not to have the possibility of modifying the contents of an external register and later repeating the LOAD instruction. The implementation of both or only one of the methods described in Examples 2 and 3 is a choice left to the design engineer.

FIG. 6a depicts a block diagram of the contents of history buffer 12, of the head and tail pointers, of general registers R1 through R6 and of the instruction pointer ("IP") and carry bit ("C") registers at a time corresponding to the beginning, or far left-hand side, of FIG. 5. As described above, history buffer 12 is initially empty, general registers R1 through R6 contain the values OLDR1 through OLDR6, respectively, and the instruction pointer and carry bit registers contain the values IP1 and C1, respectively. An inward arrow indicates that controller 14 will enter data into the first entry of history buffer 12, the next available entry. An outward arrow at the same entry indicates that no data in history buffer 12 is valid. For purposes of illustration, all fields in history buffer 12 are blank. In actual practice, the fields of history buffer 12 may contain invalid data from previous operations.

FIRST CLOCK CYCLE

During T1/T2 of the first clock cycle, data processor 10 decodes instruction 20'. Controller 14 also reviews the state field of the oldest instruction, instruction 20'. Controller 14 takes no action at this time because the oldest instruction is unfinished.

During T3/T4 of the first clock cycle, data processor 10 issues instruction 20'. Controller 14 enters data into the first entry of history buffer 12 describing instruction 20' and the status of data processor 10 at the beginning of the first clock cycle.

FIG. 6b depicts a block diagram of the contents of history buffer 12, of the head and tail pointers, of general registers R1 through R6 and of the instruction pointer ("IP") and carry bit ("C") registers at a time corresponding to the end of the first clock cycle depicted in FIG. 5. The first entry of history buffer 12 now contains the values depicted, in the fields depicted, that describe the status of data processor 10 immediately before data processor 10 issued instruction 20'. General registers R1 through R6 contain the values OLDR1 through OLDR6, respectively. The instruction pointer and carry bit registers now contain the values IP2 and C2, respectively, reflecting that data processor 10 has incremented the instruction pointer and that the carry bit register may have been modified by the previous steps. An inward arrow indicates that controller 14 will enter data into the second entry of history buffer 12, the next available entry. An outward arrow adjacent the first entry indicates that controller 14 did not retire any instructions in the first clock cycle.

SECOND CLOCK CYCLE

During T1/T2 of the second clock cycle, data processor 10 decodes instruction 22', a LOAD instruction. Instruction 20' completes and the appropriate execution unit writes back the result to register R1. Controller 14 reviews the state field of the oldest instruction, instruction 20'. Controller 14 retires the oldest instruction, instruction 20', because it completed without fault. Controller 14 uses a register or tail pointer to identify which entry in history buffer 12 corresponds to the oldest valid instruction. Controller 14 uses a second register or head pointer to identify which entry in history buffer 12 corresponds to the youngest valid instruction. If the state field of the oldest instruction indicates that the oldest instruction executed correctly (flagged "DONE"), then controller 14 "retires" the instruction by incrementing the tail pointer downward towards the head pointer. The tail pointer then points to the entry corresponding to the next oldest instruction. Controller 14 examines the next oldest instruction, here the instruction corresponding to the second entry. If its state field indicates successful execution, then it too is retired. If the next oldest instruction is not tagged DONE or has an exception associated with it, then controller 14 will wait until the instruction is tagged DONE or will delete the instruction, respectively. In the preferred embodiment, controller 14 examines all state fields simultaneously. The operation of the tail pointer is more fully described below in connection with FIGS. 8 through 14. Controller 14 cannot retire any more instructions because no more are complete.

During T3/T4 of the second clock cycle, data processor 10 issues instruction 22'. Controller 14 enters data into the second entry of history buffer 12 describing instruction 22' and the status of data processor 10 at the beginning of the second clock cycle and as depicted in FIG. 6b.

FIG. 6c depicts a block diagram of the contents of history buffer 12, of the head and tail pointers, of general registers R1 through R6 and of the instruction pointer ("IP") and carry bit ("C") registers at a time corresponding to the end of the second clock cycle depicted in FIG. 5. The second entry of history buffer 12 now contains the values depicted, in the fields depicted, that describe the status of data processor 10 immediately before data processor 10 issued instruction 22'. General register R1 contains the value NEWR1. General registers R2 through R6 contain the values OLDR2 through OLDR6, respectively. The instruction pointer and carry bit registers now contain the values IP3 and C3, respectively, reflecting that data processor 10 has incremented the instruction pointer and that the carry bit register may have been modified by the previous steps. An inward arrow indicates that controller 14 will enter data into the third entry of history buffer 12, the next available entry. An outward arrow adjacent the second entry indicates that controller 14 retired instruction 20'.

THIRD CLOCK CYCLE

During T1/T2 of the third clock cycle, data processor 10 decodes instruction 24. Controller 14 also reviews the state field of the oldest instruction, instruction 22'. Controller 14 takes no action at this time because the oldest instruction is not finished.

During T3/T4 of the third clock cycle, data processor 10 issues instruction 24. Controller 14 enters data into the third entry of history buffer 12 describing instruction 24 and the status of data processor 10 at the beginning of the third clock cycle and as depicted in FIG. 6c.

FIG. 6d depicts a block diagram of the contents of history buffer 12, of the head and tail pointers, of general registers R1 through R6 and of the instruction pointer ("IP") and carry bit ("C") registers at a time corresponding to the end of the third clock cycle depicted in FIG. 5. The third entry of history buffer 12 now contains the values depicted, in the fields depicted, that describe the status of data processor 10 immediately before data processor 10 issued instruction 24. General register R1 contains the value NEWR1. General registers R2 through R6 contain the values OLDR2 through OLDR6, respectively. The instruction pointer and carry bit registers contain the values IP4 and C4, respectively, reflecting that data processor 10 has incremented the instruction pointer and that the carry bit register may have been modified by the previous steps. An inward arrow indicates that controller 14 will enter data into the fourth entry of history buffer 12, the next available entry. An outward arrow adjacent the second entry indicates that controller 14 did not retire any instructions in the third clock cycle.

FOURTH CLOCK CYCLE

During T1/T2 of the fourth clock cycle, data processor 10 decodes instruction 26. Instruction 24 completes and the appropriate execution unit writes back the result to register R3. Controller 14 reviews the state field of the oldest instruction, instruction 22'. Controller 14 takes no action at this time because the oldest instruction is not finished. In addition, an interrupt is asserted.

During T3/T4 of the fourth clock cycle, data processor 10 issues instruction 26. Controller 14 enters data into the fourth entry of history buffer 12 describing instruction 26 and the status of data processor 10 at the beginning of the fourth clock cycle and as depicted in FIG. 6d. Controller 14 loads an EXCEPTION flag into the state field of the third entry of history buffer 12 indicating that an interrupt was asserted while instruction 24 was executing. Controller 14 also loads the exception vector field of the third entry with "VECTOR1."

FIG. 6e depicts a block diagram of the contents of history buffer 12, of the head and tail pointers, of general registers R1 through R6 and of the instruction pointer ("IP") and carry bit ("C") registers at a time corresponding to the end of the fourth clock cycle depicted in FIG. 5. The fourth entry of history buffer 12 now contains the values depicted, in the fields depicted, that describe the status of data processor 10 immediately before data processor 10 issued instruction 26. General registers R1 and R3 contain the values NEWR1 and NEWR3, respectively. General registers R2 and R4 through R6 contain the values OLDR2 and OLDR4 through OLDR6, respectively. The instruction pointer and carry bit registers now contain the values IP5 and C5, respectively, reflecting that data processor 10 has incremented the instruction pointer and that the carry bit register may have been modified by the previous steps. An inward arrow indicates that controller 14 will enter data into the fifth entry of history buffer 12, the next available entry. An outward arrow adjacent the second entry indicates that controller 14 did not retire any instructions in the fourth clock cycle.

FIFTH CLOCK CYCLE

During T1/T2 of the fifth clock cycle, data processor 10 does not decode another instruction because of the outstanding interrupt. Instructions 22' and 26 complete and the appropriate execution units write back the results, NEWR2 and NEWR4, to register R2 and R4, respectively. Controller 14 also reviews the state field of the oldest instruction, instruction 22'. Controller 14 retires the oldest instruction, instruction 22', because it completed without fault (an interrupt is not assigned to a LOAD or a STORE instruction). Controller 14 cannot retire any more instructions because the next oldest instruction has an exception associated with it.

During T3/T4 of the fifth clock cycle, controller 14 loads an EXCEPTION flag into the state field of the fourth entry of history buffer 12 indicating that an interrupt was asserted while instruction 26 was executing. Controller 14 is designed so that it cannot load an exception flag into the entry corresponding to the LOAD instruction, instruction 22'. Instead, controller 14 loads a DONE flag into the state field of the second entry of history buffer 12. Controller 14 also loads the exception vector field of the fourth entry with "VECTOR1."

FIG. 6f depicts a block diagram of the contents of history buffer 12, of the head and tail pointers, of general registers R1 through R6 and of the instruction pointer ("IP") and carry bit ("C") registers at a time corresponding to the end of the fifth clock cycle depicted in FIG. 5. General registers R1 through R4 contain the values NEWR1 through NEWR4, respectively. General registers R5 and R6 contain the values OLDR5 and OLDR6, respectively. The instruction pointer and carry bit registers contain the values IP5 and C6, respectively, reflecting that data processor 10 did not increment the instruction pointer but that the carry bit register may have been modified by the previous steps. An inward arrow indicates that controller 14 will enter data into the fifth entry of history buffer 12, the next available entry. An outward arrow adjacent the third entry indicates that controller 14 retired one instruction in the fifth clock cycle.

SIXTH CLOCK CYCLE

Before data processor 10 branches to the exception routine identified by the exception vector field, "VECTOR1," controller 14 "deletes" instruction 24 and each issued instruction after instruction 24. Although LOAD instruction 22' was executing when the interrupt was asserted, instruction 24 is the first instruction in the depicted instruction stream that is tagged with the interrupt. Controller 14, therefore, will not delete instruction 22'. It should be understood that if instruction 22' had not been at the top of history buffer 12 when the interrupt was asserted, then controller 14 would have ultimately deleted instruction 22' in addition to one or more instructions preceding instruction 22'. For instance, if instruction 20' had been as long an instruction as is instruction 20 depicted in FIG. 3, then controller 14 would have tagged instruction 20' with the interrupt when instruction 20' completed. The tail pointer would then remain on the first entry of history buffer 12. Controller 14 will delete all instructions between the tail pointer and the head pointer, including instruction 22'. Controller 14 deletes instructions 24 and 26 as described above in connection with FIG. 4h. Data processor 10 then appears as if it completed all instructions that completed before the interrupt was asserted and as if it started none of the subsequent instructions. Data processor 10 therefore appears as a precise machine to the programmer.

FIG. 6g depicts a block diagram of the contents of history buffer 12, of the head and tail pointers, of general registers R1 through R6 and of the instruction pointer ("IP") and carry bit ("C") registers at a time after data processor 10 has restored its state as described above. All instructions have either been retired or deleted. History buffer 12 is now "empty," i.e. the head and tail pointers point to the same entry in history buffer 12. General registers R1 and R2 contain the values NEWR1 and NEWR2, respectively. General registers R3 through R6 contain the values OLDR3 through OLDR6, respectively. The instruction pointer and carry bit registers contain the values IP3 and C3, respectively. Data processor 10 will branch to an error correcting subroutine indicated by the contents of the exception vector of the first entry, "VECTOR1."

b. Exceptions and Incorrectly Predicted Conditions Precedent

The operation of controller 14 and history buffer 12 in conjunction with a LOAD instruction is identical to the Exceptions and incorrectly predicted condition precedent process described above in connection with FIGS. 3 through 4h.

4. Example 3, STORE Instructions a. Interrupts

FIG. 7 depicts a third timing diagram 16" of data processor 10 depicted in FIG. 1. Timing diagram 16" depicts a clocking signal 18 and six exemplary instructions 20', 22", 24, 26, 28 and 30. Instruction 22" is a STORE instruction and therefore modifies a register external to data processor 10. Instruction 20 has been modified by shortening its length to more clearly highlight the disclosed invention. Instruction 20 therefore is labeled 20" in FIG. 7. FIG. 7 is otherwise identical to FIG. 3. In addition, FIGS. 8a through 8h depict the same variables as depicted in FIGS. 4a through 4h.

In this hypothetical example, data processor 10 operates and is programmed according to the same assumptions and conventions as described in connection with FIG. 3. Data processor 10, however, will not assign an EXCEPTION state field to an instruction that modifies an external register. As described above, such an instruction cannot be reversed if necessary because of an exception, incorrectly predicted condition precedent or interrupt.

In the preferred embodiment, more STORE instructions have irreversible effects upon external registers than do LOAD instructions. Example 3 describes a method of operation where it is desired not to have the possibility of modifying the contents of an external register and later repeating the STORE instruction. This design choice is implemented by not executing a STORE instruction until the STORE instruction is at the top of history buffer 12. The STORE instruction is otherwise decoded and issued normally. A STORE instruction will never have to be undone for a different instruction's error. By construction, all previous instructions will have completed successfully before the STORE instruction begins executing.

Figure 8A:
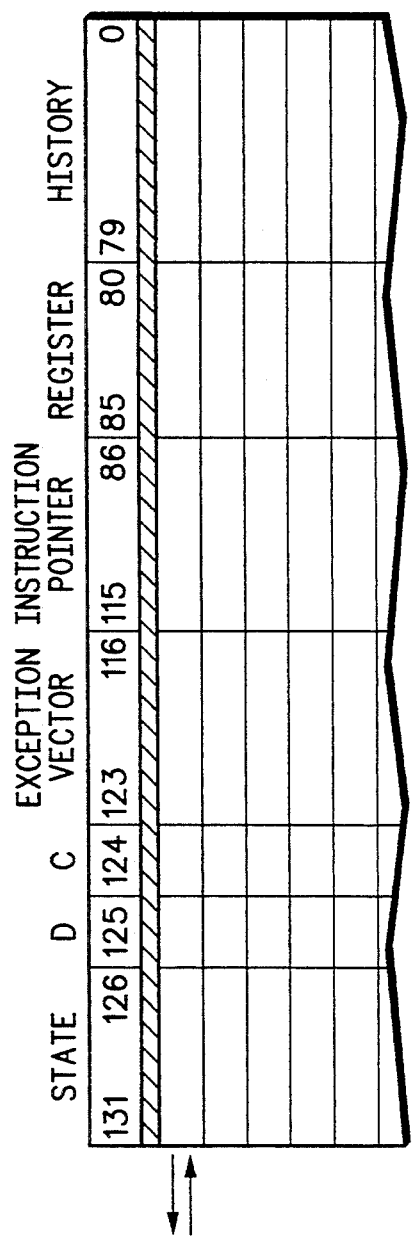

FIG. 8a depicts a block diagram of the contents of history buffer 12, of the head and tail pointers, of general registers R1 through R6 and of the instruction pointer ("IP") and carry bit ("C") registers at a time corresponding to the beginning, or far left-hand side, of FIG. 7. As described above, history buffer 12 is initially empty, general registers R1 through R6 contain the values OLDR1 through OLDR6, respectively, and the instruction pointer and carry bit registers contain the values IP1 and C1, respectively. An inward arrow indicates that controller 14 will enter data into the first entry of history buffer 12, the next available entry. An outward arrow at the same entry indicates that no data in history buffer 12 is valid. For purposes of illustration, all fields in history buffer 12 are blank. In actual practice, the fields of history buffer 12 may contain invalid data from previous operations.

FIRST CLOCK CYCLE

During T1/T2 of the first clock cycle, data processor 10 decodes instruction 20''. Controller 14 also reviews the state field of the oldest instruction, instruction 20''. Controller 14 takes no action at this time because the oldest instruction is unfinished.

During T3/T4 of the first clock cycle, data processor 10 issues instruction 20''. Controller 14 enters data into the first entry of history buffer 12 describing instruction 20'' and the status of data processor 10 at the beginning of the first clock cycle.

Figure 8B:
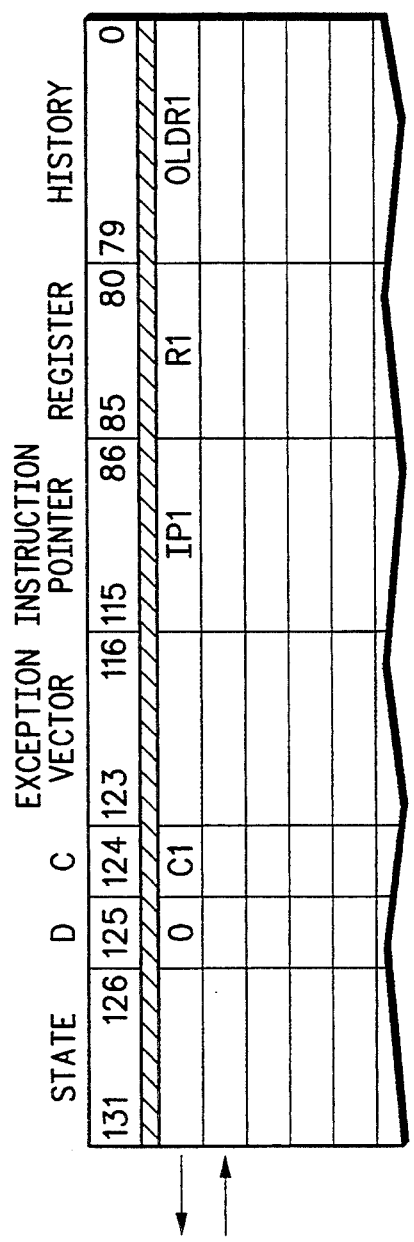

FIG. 8b depicts a block diagram of the contents of history buffer 12, of the head and tail pointers, of general registers R1 through R6 and of the instruction pointer ("IP") and carry bit ("C") registers at a time corresponding to the end of the first clock cycle depicted in FIG. 7. The first entry of history buffer 12 now contains the values depicted, in the fields depicted, that describe the status of data processor 10 immediately before data processor 10 issued instruction 20''. General registers R1 through R6 contain the values OLDR1 through OLDR6, respectively. The instruction pointer and carry bit registers now contain the values IP2 and C2, respectively, reflecting that data processor 10 has incremented the instruction pointer and that the carry bit register may have been modified by the previous steps. An inward arrow indicates that controller 14 will enter data into the second entry of history buffer 12, the next available entry. An outward arrow adjacent the first entry indicates that controller 14 did not retire any instructions in the first clock cycle.

SECOND CLOCK CYCLE

During T1/T2 of the second clock cycle, data processor 10 decodes instruction 22'', a STORE instruction. Controller 14 reviews the state field of the oldest instruction, instruction 20''. Controller 14 cannot retire any instructions because none are complete.

During T3/T4 of the second clock cycle, data processor 10 issues instruction 22''. Controller 14 does not enable the STORE execution unit to begin executing instruction 22'' until it is at the top of history buffer 12. Controller 14 enters data into the second entry of history buffer 12 describing instruction 22'' and the status of data processor 10 at the beginning of the second clock cycle and as depicted in FIG. 8b.

FIG. 8c depicts a block diagram of the contents of history buffer 12, of the head and tail pointers, of general registers R1 through R6 and of the instruction pointer ("IP") and carry bit ("C") registers at a time corresponding to the end of the second clock cycle depicted in FIG. 7. The second entry of history buffer 12 now contains the values depicted, in the fields depicted, that describe the status of data processor 10 immediately before data processor 10 issued instruction 22''. General registers R1 through R6 contain the values OLDR1 through OLDR6, respectively. The instruction pointer and carry bit registers now contain the values IP3 and C3, respectively, reflecting that data processor 10 has incremented the instruction pointer and that the carry bit register may have been modified by the previous steps. An inward arrow indicates that controller 14 will enter data into the third entry of history buffer 12, the next available entry. An outward arrow adjacent the first entry indicates that controller 14 did not retire any instructions.

THIRD CLOCK CYCLE

During T1/T2 of the third clock cycle, data processor 10 decodes instruction 24. Instruction 20'' completes and the appropriate execution unit writes back the result to register R1. Controller 14 reviews the state field of the oldest instruction, instruction 20''. Controller 14 retires the oldest instruction, instruction 20'', because it completed without fault.

During T3/T4 of the third clock cycle, data processor 10 issues instruction 24. Controller 14 enters data into the third entry of history buffer 12 describing instruction 24 and the status of data processor 10 at the beginning of the third clock cycle and as depicted in FIG. 8c.

FIG. 8d depicts a block diagram of the contents of history buffer 12, of the head and tail pointers, of general registers R1 through R6 and of the instruction pointer ("IP") and carry bit ("C") registers at a time corresponding to the end of the third clock cycle depicted in FIG. 7. The third entry of history buffer 12 now contains the values depicted, in the fields depicted, that describe the status of data processor 10 immediately before data processor 10 issued instruction 24. General register R1 contains the value NEWR1. General registers R2 through R6 contain the values OLDR2 through OLDR6, respectively. The instruction pointer and carry bit registers contain the values IP4 and C4, respectively, reflecting that data processor 10 has incremented the instruction pointer and that the carry bit register may have been modified by the previous steps. An inward arrow indicates that controller 14 will enter data into the fourth entry of history buffer 12, the next available entry. An outward arrow adjacent the second entry indicates that controller 14 retired instruction 20'' during the third clock cycle.

FOURTH CLOCK CYCLE

During T1/T2 of the fourth clock cycle, data processor 10 decodes instruction 26. Instruction 24 completes and the appropriate execution unit writes back the result to register R3. Controller 14 enables the appropriate execution to begin executing STORE instruction 22″. Controller 14 reviews the state field of the oldest instruction, instruction 22″. Controller 14 takes no action at this time because the oldest instruction is not finished. In addition, an interrupt is asserted.

During T3/T4 of the fourth clock cycle, data processor 10 issues instruction 26. Controller 14 enters data into the fourth entry of history buffer 12 describing instruction 26 and the status of data processor 10 at the beginning of the fourth clock cycle and as depicted in FIG. 8d. Controller 14 loads an EXCEPTION flag into the state field of the third entry of history buffer 12 indicating that an interrupt was asserted while instruction 24 was executing. Controller 14 also loads the exception vector field of the third entry with "VECTOR1."

FIG. 8e depicts a block diagram of the contents of history buffer 12, of the head and tail pointers, of general registers R1 through R6 and of the instruction pointer ("IP") and carry bit ("C") registers at a time corresponding to the end of the fourth clock cycle depicted in FIG. 7. The fourth entry of history buffer 12 now contains the values depicted, in the fields depicted, that describe the status of data processor 10 immediately before data processor 10 issued instruction 26. General registers R1 and R3 contain the values NEWR1 and NEWR3, respectively. General registers R2 and R4 through R6 contain the values OLDR2 and OLDR4 through OLDR6, respectively. The instruction pointer and carry bit registers now contain the values IP5 and C5, respectively, reflecting that data processor 10 has incremented the instruction pointer and that the carry bit register may have been modified by the previous steps. An inward arrow indicates that controller 14 will enter data into the fifth entry of history buffer 12, the next available entry. An outward arrow adjacent the second entry indicates that controller 14 did not retire any instructions in the fourth clock cycle.

FIFTH CLOCK CYCLE

During T1/T2 of the fifth clock cycle, data processor 10 does not decode another instruction because of the outstanding interrupt. Instruction 26 completes and the appropriate execution unit writes back the result NEWR4 to register R4. Controller 14 also reviews the state field of the oldest instruction, instruction 22″. Controller 14 does not retire instruction 22′, because it has not completed.

During T3/T4 of the fifth clock cycle, controller 14 loads an EXCEPTION flag into the state field of the fourth entry of history buffer 12 indicating that an interrupt was asserted while instruction 26 was executing. Controller 14 also loads the exception vector field of the fourth entry with "VECTOR1."

FIG. 8f depicts a block diagram of the contents of history buffer 12, of the head and tail pointers, of general registers R1 through R6 and of the instruction pointer ("IP") and carry bit ("C") registers at a time corresponding to the end of the fifth clock cycle depicted in FIG. 7. General registers R1, R3 and R4 contain the values NEWR1, NEWR3 and NEWR4, respectively. General registers R2, R5 and R6 contain the values OLDR2, OLDR5 and OLDR6, respectively. The instruction pointer and carry bit registers contain the values IP5 and C6, respectively, reflecting that data processor 10 did not increment the instruction pointer but that the carry bit register may have been modified by the previous steps. An inward arrow indicates that controller 14 will enter data into the fifth entry of history buffer 12, the next available entry. An outward arrow adjacent the second entry indicates that controller 14 did not retire any instruction in the fifth clock cycle.

SIXTH CLOCK CYCLE

During T1/T2 of the sixth clock cycle, data processor 10 does not decode another instruction because of the outstanding interrupt. Instruction 22″ completes and the appropriate execution unit writes back the result NEWR2 to register R2. As indicated by the dashed instruction in FIG. 7, instruction 22″ completes one cycle later than it would have had it not been a STORE instruction. Controller 14 also reviews the state field of the oldest instruction, instruction 22″. Controller 14 retires STORE instruction 22″. Controller 14 does not retire instruction 24 because it is tagged with an interrupt.

During T3/T4 of the fifth clock cycle, controller 14 loads an DONE flag into the state field of the second entry of history buffer 12. Controller 14 is designed so that it cannot load an exception flag into the entry corresponding to a STORE instruction, instruction 22″.

FIG. 8g depicts a block diagram of the contents of history buffer 12, of the head and tail pointers, of general registers R1 through R6 and of the instruction pointer ("IP") and carry bit ("C") registers at a time corresponding to the end of the sixth clock cycle depicted in FIG. 7. General registers R1 through R4 contain the values NEWR1 through NEWR4, respectively. General registers R5 and R6 contain the values OLDR5 and OLDR6, respectively. The instruction pointer and carry bit registers contain the values IP5 and C6, respectively, reflecting that data processor 10 did not increment the instruction pointer but that the carry bit register may have been modified by the previous steps. An inward arrow indicates that controller 14 will enter data into the fifth entry of history buffer 12, the next available entry. An outward arrow adjacent the third entry indicates that controller 14 retired one instruction in the sixth clock cycle.

Before data processor 10 branches to the exception routine identified by the exception vector field, "VECTOR1," controller 14 "deletes" all instructions between the head and tail pointers. Although STORE instruction 22″ was executing when the interrupt was asserted, controller 14 will not tag a STORE instruction with an interrupt. Instruction 24, therefore, is the first instruction in the depicted instruction stream that is tagged with the interrupt. Controller 14 will not delete instruction 22″. It should be understood that a STORE instruction need never be deleted. By waiting until all preceding instructions have completed successfully, a STORE instruction need never be deleted unless the STORE exception itself generates an exception. Controller 14 deletes instructions 24 and 26 as described above in connection with FIG. 4h. Data processor 10 then appears as if it completed all instructions that completed before the interrupt was asserted and as if it started none of the subsequent instructions. Data processor 10 therefore appears as a precise machine to the programmer.

FIG. 8h depicts a block diagram of the contents of history buffer 12, of the head and tail pointers, of general registers R1 through R6 and of the instruction pointer ("IP") and carry bit ("C") registers at a time after data processor 10 has restored its state as described above. All instructions have either been retired or deleted. History buffer 12 is now "empty," i.e. the head and tail pointers point to the same entry in history buffer 12. General registers R1 and R2 contain the values NEWR1 and NEWR2, respectively. General registers R3 through R6 contain the values OLDR3 through OLDR6, respectively. The instruction pointer and carry bit registers contain the values IP3 and C3, respectively. Data processor 10 will branch to an error correcting subroutine indicated by the contents of the exception vector of the first entry, "VECTOR1."

b. Exceptions and Incorrectly Predicted Conditions Precedent

The operation of controller 14 and history buffer 12 in conjunction with a STORE instruction is analogous to the Interrupt process described above in connection with FIGS. 7 through 8h. An exception or incorrectly predicted condition precedent is assigned only to the instruction that generated it. Because a STORE instruction is not executed until all preceding instructions have completed successfully, there will never be an occasion to delete a STORE instruction because of an exception or incorrectly predicted condition precedent, unless the STORE instruction itself generates the exception. Consequently, an external register will never be modified by a STORE instruction where it could be necessary to undo the modification at a later time.

D. History Buffer Operation

Figure 9:
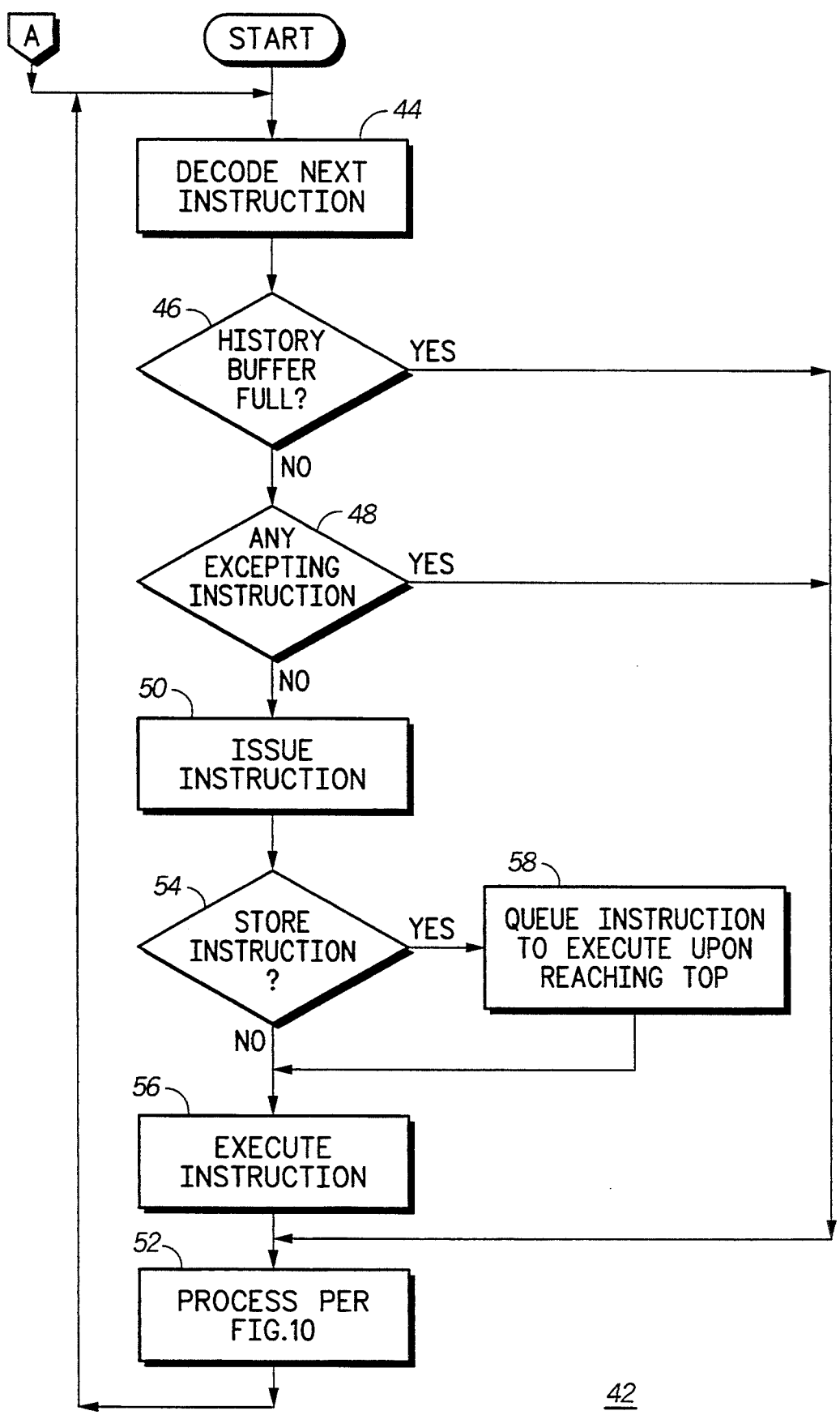
FIG. 9 depicts a flow chart of one set of steps operable to implement the timing diagrams depicted in FIGS. 3, 5 and 7.

FIG. 9 depicts a flow chart 42 of one set of steps operable to implement the timing diagrams depicted in FIGS. 3, 5 and 7. Controller 14 executes flow chart 42, in the absence of an exception, interrupt or incorrectly predicted condition precedent, each clock cycle. Controller 14 begins flow chart 42 by decoding an instruction, step 44. Controller 14 will not progress beyond instruction decode unless the history buffer has room for another entry, step 46, and unless there are no exceptions, interrupts or incorrectly predicted conditions precedent outstanding, step 48. If these two conditions are meet, then controller 14 will issue or allow the instruction to issue, step 50. Controller 14 also updates the next entry in the history buffer with data relating to the decoded instruction and to the status of data processor 10 as described in connection with FIG. 2 and Examples 1, 2 and 3 in step 50.

As depicted, if either the history buffer is full or an exception is outstanding, then controller 14 will branch directly to step 52. Step 52 is more fully described below in connection with FIG. 10. Controller 14 eventually returns to step 44 to begin processing during the next clock cycle. Controller 14 will not return to step 44 in the next clock cycle if controller 14 detects that the entry at the top of history buffer 12 has been tagged with an exception, interrupt or incorrectly predicted condition precedents while executing step 52. In such a case, controller 14 will branch to an appropriate subroutine as described below. Such a subroutine will delay the return of controller 14 to step 44.

Controller 14 divides the instruction set of data processor 10 into two or more subsets of instructions. One of these subsets may be characterized as containing instructions that irreversibly modify registers. The other subset may be characterized as containing instructions that only modify restorable registers. These restorable registers are restored by replacing their contents with a stored data value. In the preferred embodiment, memory STORE instructions irreversibly modify registers. Controller 14, therefore, singles out memory STORE instructions, step 54, after issuing an instruction in step 50. Memory STORE instructions do not begin executing until all preceding instructions have successfully completed. All other instructions issue directly, step 56. STORE instructions are queued to execute when they reach the top of history buffer 12, step 58. STORE instructions then execute, step 56. As depicted, controller 14 also allows instructions other than memory STORE instructions to issue in step 56. The instruction is then processed in step 52.

The disclosed invention may be modified to treat memory LOAD instructions as STORE instructions. Conversely, other instructions may be treated as are memory STORE and LOAD instructions in the preferred embodiment for the same reasons or for different reasons.

Figure 10:
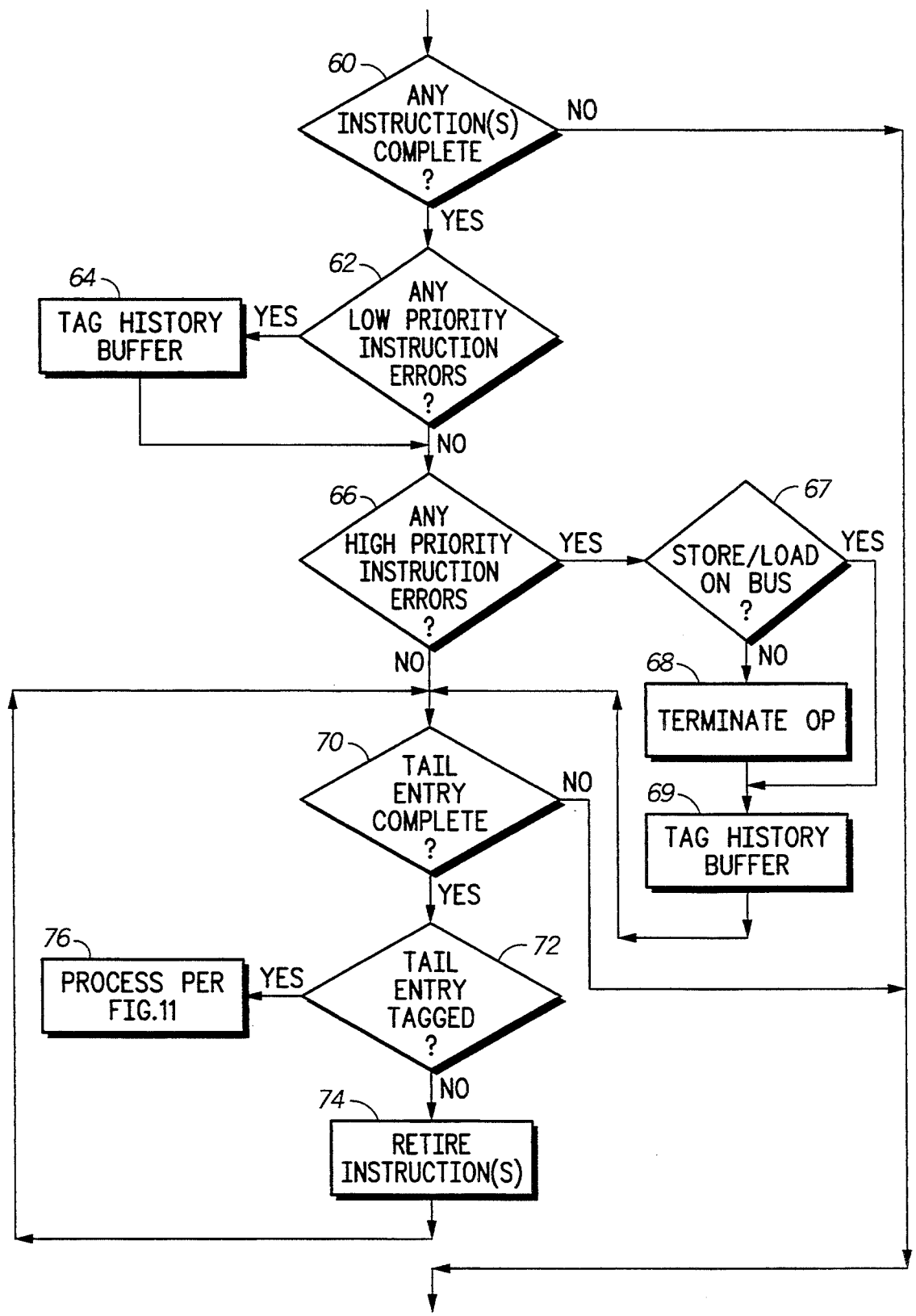
FIG. 10 depicts a flow chart of one set of steps operable to implement one step depicted in FIG. 9.

FIG. 10 depicts a flow chart of one set of steps operable to implement step 52 depicted in FIG. 9. Controller 14 determines if any instructions complete operation during the instant clock cycle, step 60. If any instruction writes back during the instant clock cycle, then controller 14 stores the returned state field flag, steps 62, 64, and 66 through 69. If the complete instruction does not generate an exception or incorrectly predicted condition precedent and if an interrupt was not asserted while the instruction was executing, then step 60 will tag the state field of the complete instruction as DONE. If no instruction writes back during the instant clock cycle, then controller 14 branches to the end of step 52.

Steps 62, 64, and 66 through 69 describe, generally, a two-tier priority procedure for handling exceptions, interrupts and incorrect speculative instructions. A single instruction may have two errors associated with it. For instance, an instruction may have an exception and an interrupt associated with it or may have an interrupt and an incorrect speculative instruction associated with it. Controller 14 must then decide which condition it should remedy first. In the preferred embodiment, interrupts are given a higher priority. As depicted, controller 14 tests for a low and a high priority error, steps 62 and 66, respectively, and tags the exception vector field of the appropriate entry in history buffer 12 with the corresponding flag, steps 64 and 69. Controller 14 prioritizes the errors if two errors occur simultaneously by overwriting the low priority exception vector field flag with the high priority exception vector field flag. The ordering of steps 62 and 66 accomplishes this result. As described above, controller 14 will not tag a STORE or a LOAD instruction with an interrupt.

Steps 67 and 68 separate previously described steps 66 and 69. Steps 67 and 68 implement a feature of the preferred embodiment. Namely, data processor 10 is able to terminate a STORE or a LOAD instruction during the decode and issue phase of the instruction if an exception, incorrectly predicted condition precedent or interrupt exists. These instructions typically require a long period of time to execute so it may be advantageous to be able to terminate them before they are placed on the bus of data processor 10. In the preferred embodiment, STORE and LOAD instructions not yet on the bus are detected in step 67 and terminated in step 68. If no LOAD or STORE instruction is eligible for termination, then step 68 is bypassed.

After controller 14 updates history buffer 12 following the completion of an instruction or instructions in steps 60, 64 and 69, controller 14 determines if the oldest instruction has written back, step 70. If the oldest instruction has not written back its result, then controller 14 must wait until the following clock cycle for the next complete instruction. Consequently, step 70 branches to the end of step 52 if the tail points to an instruction that has not yet written back. If the oldest instruction has written back its result, then controller 14 will determine if the tail entry points to an entry tagged with an EXCEPTION flag, step 72. If the tail pointer points to a successfully completed instruction, then controller 14 will retire the instruction, step 74 and return to step 70. Controller 14 will continue to retire instructions in history buffer 12 until history buffer 12 is empty or until the top entry contains an EXCEPTION state flag. If the tail pointer points to an instruction with an EXCEPTION flag, then controller 14 will branch to step 76. Step 76 is more fully described in connection with FIG. 11.

Figure 11:
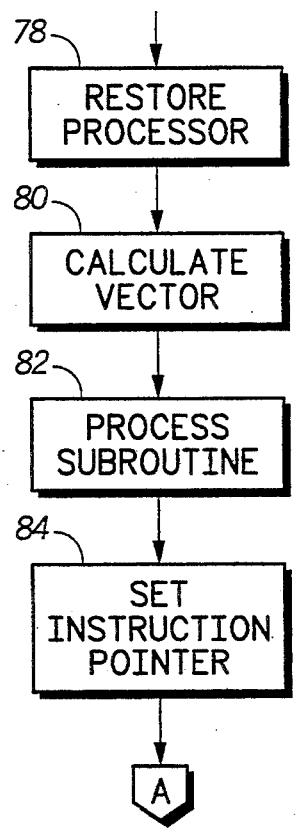
FIG. 11 depicts a flow chart of one set of steps operable to implement one step depicted in FIG. 10.
Figure 14:
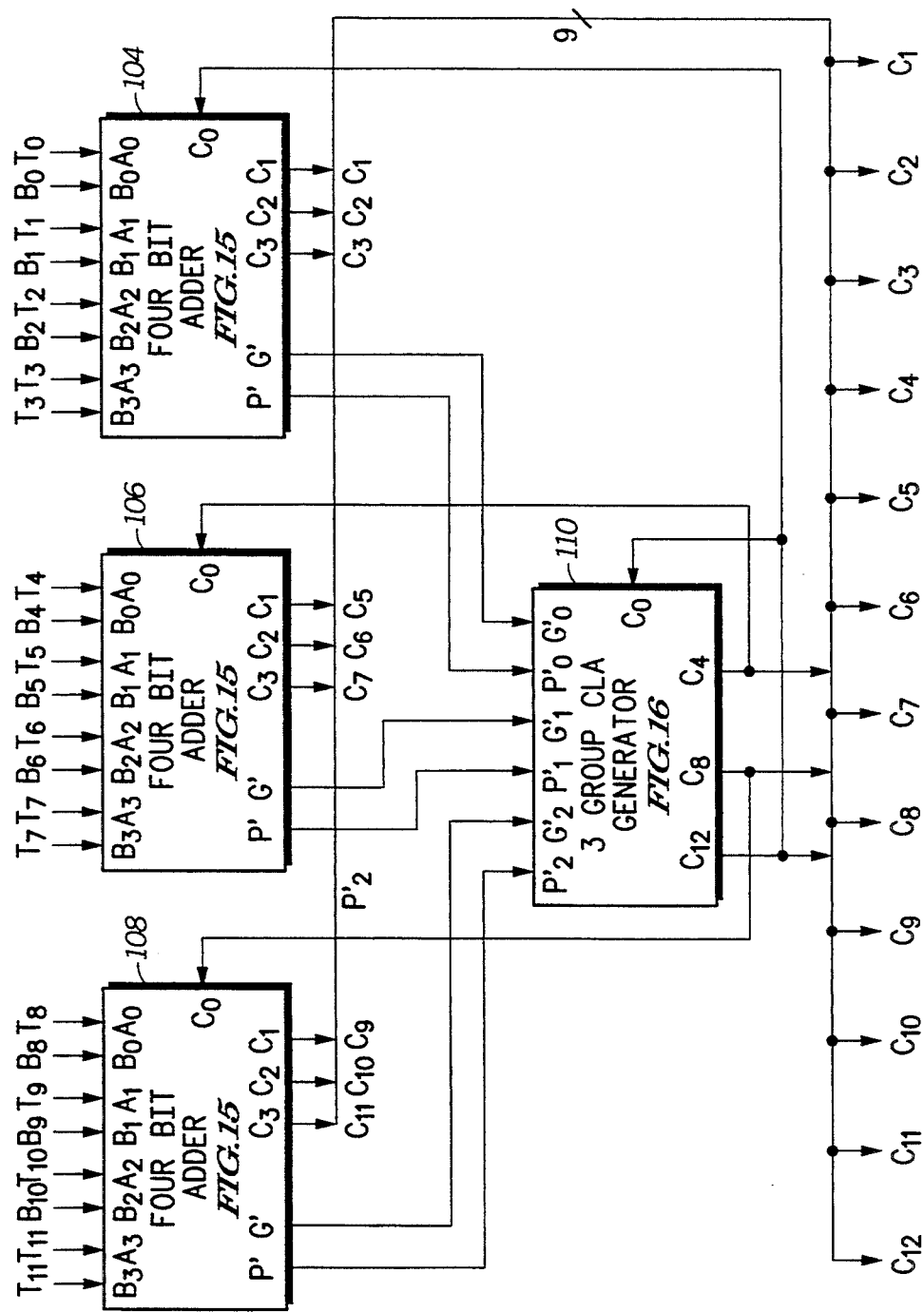
FIG. 14 depicts a block diagram of the carry look ahead adder illustrated in FIG. 12.

FIG. 11 depicts a flow chart of one set of steps operable to implement step 76 depicted in FIG. 14. Controller 14 restores the status of data processor 14 by deleting the instruction indicated by the head pointer, by decrementing the head pointer and by continuing this process until the head pointer and tail pointer are coincident, step 78. As described above, controller 14 deletes such an instruction by loading the contents of the history field, carry bit field and the instruction pointer field into the register specified in the register field, into the carry bit register and into the instruction pointer register, respectively. Controller 14 may save certain register values at this point if it is possible that the register values may be changed during the subsequent subroutine. These register values would be reloaded into the appropriate register at the conclusion of the subroutine. Controller 14 then determines the memory address of the first instruction of a subroutine that will account for the exception or interrupt, step 80. This subroutine is called the "exception handler."

Data processor 10 executes the instructions residing at the address calculated in step 80, step 82. The exception handler need not account for the out of order execution of data processor 10. Controller 14 hides this complication from the exception handler and, hence, from the programmer. After data processor 10 completes the exception handler, controller 14 loads the instruction pointer of data processor 10 with the value restored in step 78. Data processor 10 then executes the instruction stream beginning at this address. As depicted in FIGS. 4h, 6g and 8h, data processor 10 appears as if all instructions residing in memory addresses before this address completed successfully and as if no instructions residing in memory addresses at or after this address started.

In the event of an incorrect speculative execution, steps 80 and 82 may increment the instruction pointer of data processor 10 by one unit so that data processor 10 resumes executing instructions at an address immediately after the address containing the original speculative instruction. Logically, this is the instruction corresponding to the condition precedent being false.

In the preferred embodiment, controller 14 calculates the address for the exception routine by concatenating the twenty most significant bits of a vector base register with the nine bit exception vector field corresponding to the exception generating instruction and appending three zeros. The vector base register is a control register of data processor 10. Its contents are programmed by the user. As is known in the art, the user then programs the memory address corresponding to the concatenated addresses with the desired instructions.

The delay register field indicates that a particular instruction was reordered to issue after a flow control instruction. Initially, the instruction would have been ordered to issue before the flow control instruction. Ordinarily, no instruction may issue immediately after the flow control instruction. The data processor must wait until the flow control instruction has determined the address of the next instruction until it can process the next instruction. Therefore, a compiler leaves blank the instruction slot after a flow control instruction. The instruction preceding a flow control instruction may be advantageously moved to issue immediately after the flow control instruction if the two instructions are not dependent on each other. This reordering of instructions increases throughput of the data processor by avoiding "bubbles" or gaps in the instruction stream.

Certain complications arise if the delay slot instruction causes an exception or if an interrupt is attributed to it. Because the address of the instruction after the delay slot instruction is determined by the preceding flow control instruction, the data processor can not simply increment its instruction pointer by one. A data processor typically has a register that contains the address of the executing instruction (called the instruction pointer herein) and a register that contains the address of the next instruction to be executed. This "next instruction pointer" contains the address of the instruction to be executed after the data processor executes an instruction issued in the delay slot. In such an embodiment, controller 14 saves the value of the next instruction pointer in step 78 and loads this value into the next instruction pointer in step 84. This will ensure that data processor 10 will, first, execute the instruction issued in the delay slot and, second, execute an instruction determined by the flow control instruction.

II. BUFFER POINTER

A. Introduction

Figure 12:
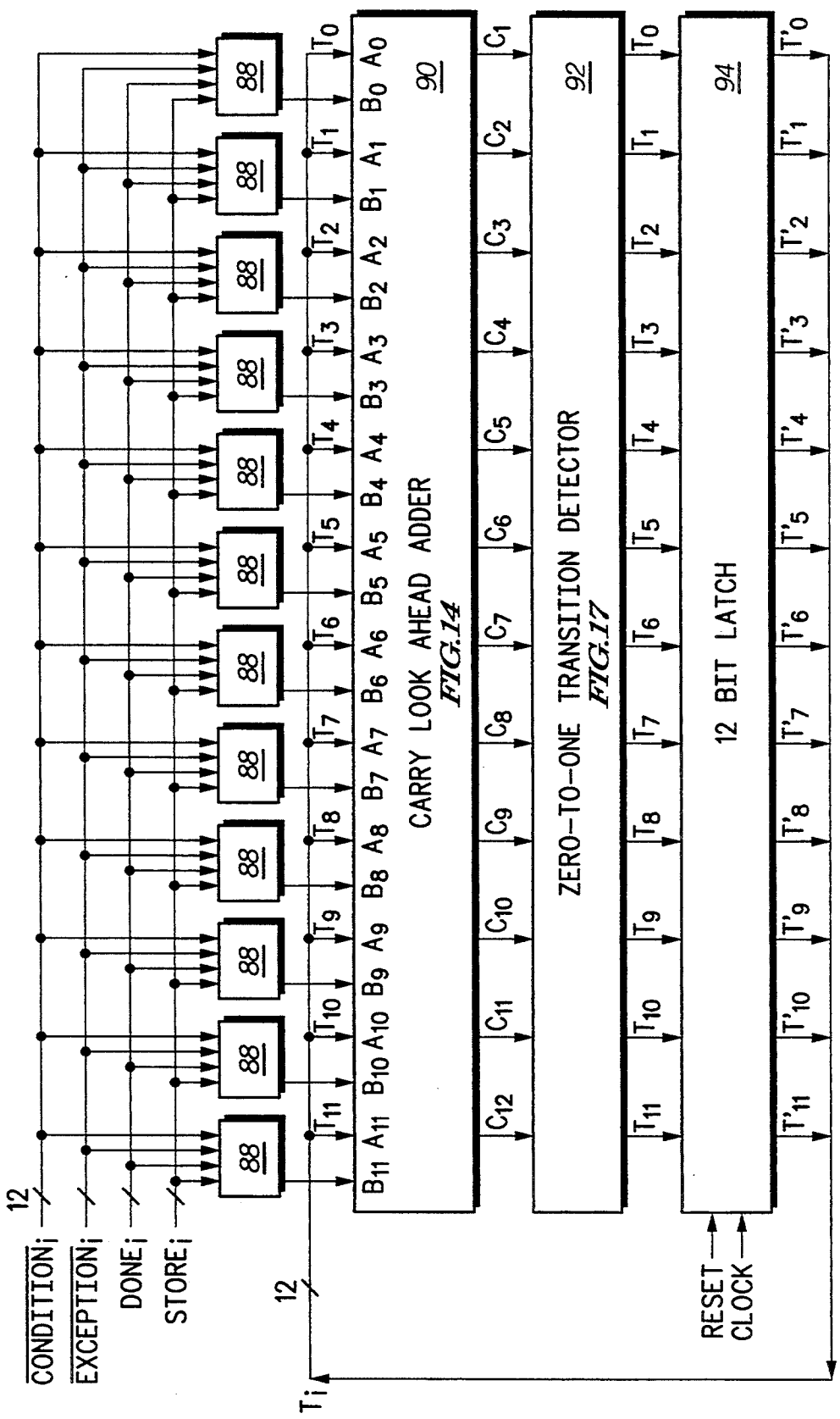
FIG. 12 depicts a block diagram of a buffer pointer constructed in accordance with the disclosed invention.

FIG. 12 depicts a block diagram of a buffer pointer 86. In the preferred embodiment, buffer pointer 86 is a portion of controller 14 and calculates the position of the tail pointer of history buffer 12 each clock cycle. Buffer pointer 86 is able to analyze all state fields of history buffer 12 and increment the tail pointer as necessary within a single clock cycle. In particular, buffer pointer 86 can increment the tail pointer through eleven entries of history buffer 12 in a single clock cycle.

B. Circuit Implementation

Tail pointer 86 receives the four buses, $\overline{\text{CONDITIONAL}_i}$, $\overline{\text{EXCEPTION}_i}$, $\text{DONE}_i$, $\text{STORE}_i$ and generates the bus $T_i$. Tail pointer 86 also uses the data present on bus $T_i$ from the previous cycle in the instant cycle. The first four of these buses relay the values of the CONDITION, EXCEPTION, DONE AND STORE state fields of each entry of history buffer 12. The bus Ti indicates the location of the tail pointer determined during the previous clock cycle. If the ith input signal Ti is high, then the tail pointer points to the ith entry. One and only one signal of Ti is ever high at a given time. The integer index "i" of each of the five buses indicates that the ith signal of a particular bus corresponds to data of the ith entry of history buffer 12. In the preferred embodiment, there are twelve entries in history buffer 12. Therefore, i ranges from zero to eleven. As described below, buffer pointer 86 can be expanded or shrunk to operate with a different size history buffer.

Tail Pointer 86 has twelve logic units 88, a carry look ahead adder (hereafter simply "adder") 90, a zero-to-one transition detector (hereafter simply "detector") 92 and a twelve bit latch (hereafter simply "latch") 94.

As depicted, the ith logic unit 88 has the ith input from each of the four buses, $\overline{\text{CONDITIONAL}}_i$, $\overline{\text{EXCEPTION}}_i$, $\text{DONE}_i$ and $\text{STORE}_i$ and generates one output $B_i$, where "i" is the integer index described above. The output $B_i$ indicates that the ith entry of history buffer is "ready-to-retire." If the ith entry of history buffer 12 is ready-to-retire, then the instruction corresponding to the ith entry executed successfully. In addition, if the ith entry is ready-to-retire, then the ith entry is eligible to be designated as the tail pointer. Logic unit 88 is more fully described below in connection with FIG. 13.

Adder 90 receives twenty-four inputs, $B_0$ through $B_{11}$ and $T_0$ through $T_{11}$, and generates twenty-four outputs, $C1$ through $C_{12}$ and $S_0$ through $S_{11}$. Of these latter two, only the twelve carry bits, $C_1$ through $C_{12}$, are output to detector 92. The twelve sum bits, $S_0$ through $S_{12}$, are not needed to determine the location of the tail pointer. According to adder convention, the ith bit add generates the (ith+1) carry bit. Ordinarily, a carry look ahead adder outputs its sum bits and only uses the carry bits internally. The most significant carry bit typically is output with the sum bits. Adder 90 operates to logically add two inputs A and B together to generate a sum, S.

Functionally, adder 90 adds a logic one to the ready-to-retire signal of the entry corresponding to the tail pointer of the previous cycle. That bit add either generates 01 or a 10, modulus 2.

If the entry corresponding to the position of the previous tail pointer is not ready-to-retire, then the bit add sum will be 01, modulus 2. The corresponding carry bit is then a logic zero. As will become apparent, this result maintains the position of the tail pointer. In particular, this bit add does not generate a carry bit. In addition, none of the other bit adds can generate a carry bit because, by definition, only one signal of the input $T_i$ contains a logic one.

If the entry corresponding to the position of the previous tail pointer is ready-to-retire, then the bit add sum will be 10 modulus 2. The corresponding carry bit is then a logic one. This result shifts the tail pointer to the entry corresponding to the next most significant bit. Adder 90 adds the carry bit from the initial bit add to the next most significant bit add. If the instruction corresponding to the next most significant bit is ready-to-retire, then its sum will also be 10, modulus 2 and the tail pointer will continue to shift. This process of adding and carrying continues until some entry is either not ready-to-retire and stops the carry bit carry or until the bit add comes full circle and stops. The carry bit carry will stop after coming full circle when it reaches a blank history buffer entry which cannot be "done." Controller 14 does not completely fill history buffer 12 before it considers history buffer 12 "full." The carry bit of the most significant bit add $(A_{11}+B_{11})$ is carried, if necessary, to the least significant bit add $(A_0+B_0)$.

Adder 90 is able to accomplish the entire add in a relatively short time because it is a carry look ahead adder. Carry look ahead adders reduce the delay associated with an add thereby allowing tail pointer 86 to advance itself through the full range of possible locations in a relatively short amount of time. Adder 90 is more fully described below in connection with FIGS. 14 through 16.

Detector 92 receives the twelve carry bits, $C_1$ through $C_{12}$, and generates the twelve outputs, $T_0$ through $T_{11}$. As described above, only one output signal is a logic level one at a given time. Up to eleven of the inputs $C1$ through $C12$, however, may be a logic level one at a given time depending upon the type and sequence of instructions which data processor 10 issues. Functionally, detector 92 determines the zero-to-one transition within the outputs $C_1$ through $C_{12}$. In the desired zero-to-one transition, the less significant carry bit equals zero and the more significant carry bit equals one. This transition corresponds to the location of the tail pointer, where, if the ith carry bit is zero and the (ith−1) carry bit is one, then the location of the tail pointer is the (ith−1) entry of history buffer 12. Detector 92 is more fully described below in connection with FIG. 17.

Latch 94 receives the twelve inputs $T_0$ through $T_{11}$ and latches their logic states for use in the following clock cycle by adder 90 and for use in the immediate clock cycle by other circuits, not shown. Latch 94 may be constructed from twelve flip-flops triggered by a suitable timing signal, here labeled CLOCK. Latch 94 may have an additional input, labeled RESET, to force a logic one into the latch connected to the signal T0. "Jamming" a one onto $T_0$ forces the tail pointer to point to the first ("zeroth") entry of history buffer 12. This feature is useful during initialization of data processor 10. Either or both of the latching and jamming functions of latch 94 may be unnecessary depending upon the particular implementation of adder 90 and upon the particular procedure used to load data into history buffer 12. The outputs $T_0$ through $T_{11}$ are connected to the signals $T_0$ through $T_{11}$, respectively.

1. Logic Units

Figure 13:
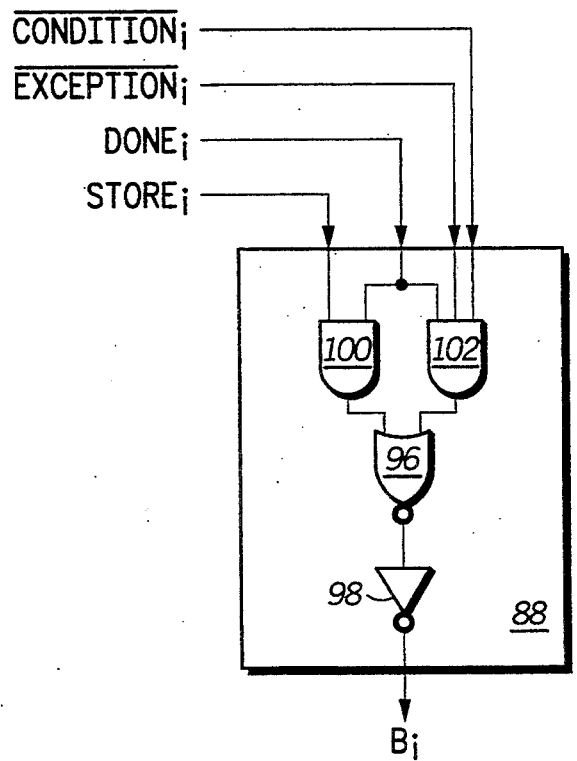
FIG. 13 depicts a logic diagram of the logic unit illustrated in FIG. 12.

FIG. 13 depicts a logic diagram of logic unit 88 illustrated in FIG. 12. Logic unit 88 generates the ready-to-retire signal for the ith entry of history buffer 12. In the illustrated embodiment, the ready-to-retire signal, $B_i$, is generated by inverting the output of a two input NOR gate 96 with an inverter 98. The two inputs to NOR gate 96 are generated by a two input AND gate 100 and a three input AND gate 102. AND gate 100 has inputs $\text{STORE}_i$ and $\text{DONE}_i$. AND gate 102 has inputs $\overline{\text{CONDITIONAL}}_i$, $\overline{\text{EXCEPTION}}_i$ and $\text{DONE}_i$. The inputs $\overline{\text{CONDITIONAL}}_i$ and $\overline{\text{EXCEPTION}}_i$ are active low.

2. Adder a. Mathematical Operation

FIG. 14 depicts a second level block diagram of adder 90 illustrated in FIG. 12. Adder 90 has three four-bit adder cells 104, 106 and 108 and a three-group carry look ahead generator (hereafter simply "generator") 110. Carry look ahead adder 90 is depicted as a two-layered adder. The first level of adder 90 is made up of four-bit adder cells 104, 106 and 108. The second layer of adder 90 is made up of generator 110. As will become apparent below, generator 110 and each four-bit adder cell share significant circuit details. The use of identical or nearly identical circuit designs reduces the manufacturing and design complexity of adder 90. One skilled in the art will readily appreciate that adder 90 may be implemented differently. For instance, each four-bit adder cell may be split into other size adder cells as desired. Also, adder 90 may be designed with more or less than two layers.

Each four-bit adder cell adds four input bit pairs, $(A_0+B_0)$ through $(A_3+B_3)$, and generates three carry bits $C_1$, $C_2$ and $C_3$, a group propagate signal $P'$ and a group generate signal, G'. In addition, each four-bit cell has a carry bit input $C_0$. The specific function of each four-bit adder cell depends upon its location in adder 90. Four-bit adder cell 104 adds the inputs $(T_0+B_0)$ through $(T_3+B_3)$ and generates carry bits $C_1$, $C_2$ and $C_3$. The input carry bit $C_0$ of four-bit adder cell 104 is connected to $C_{12}$. Four-bit adder cell 106 adds the inputs $(T_4+B_4)$ through $(T_7+B_7)$ and generates carry bits $C_5$, $C_6$ and $C_7$. The input carry bit $C_0$ of four-bit adder cell 106 is connected to $C_4$. Four-bit adder cell 108 adds the inputs $(T_8+B_8)$ through $(T_{11}+B_{11})$ and generates carry bits $C_9$, $C_{10}$ and $C_{11}$. The input carry bit $C_0$ of four-bit adder cell 108 is connected to $C_8$.

Mathematically, each four-bit adder generates four bit sums, $S_0$ though $S_3$ (not used, hence not depicted in the FIGS.), and three carry bits $C_1$ through $C_3$ (The fourth carry bit, or nth carry bit of a n-bit adder cell, is generated by generator 110):

$S_0 = A_0 \oplus B_0 \oplus C_0$ Eq. 1
$S_1 = A_1 \oplus B_1 \oplus C_1$ Eq. 2
$S_2 = A_2 \oplus B_2 \oplus C_2$ Eq. 3
$S_3 = A_3 \oplus B_3 \oplus C_3$ Eq. 4 in general, $S_i = A_i \oplus B_i \oplus C_i$ Eq. 5 and $C_1 = A_0 B_0 + C_0(A_0 + B_0)$ Eq. 6
$C_2 = A_1 B_1 + C_1(A_1 + B_1)$ Eq. 7
$C_3 = A_2 B_2 + C_2(A_2 + B_2)$ Eq. 8
$C_4 = A_3 B_3 + C_3(A_3 + B_3)$ Eq. 9 in general, $C_{i+1} = A_i B_i + C_i(A_i + B_i)$. Eq. 10

Equations 6 through 10 demonstrate how a carry bit is generated for each bit add. A carry bit is generated by the ith bit add if either (1) the ith bit add generates a carry bit locally or (2) the ith bit propagates a carry bit from the (ith−1) bit add. The ith bit add generates a carry bit locally if both bits are logic ones. This requirement may be mathematically expressed as a local generate function, $G_i$:

$G_i = A_i B_i$ Eq. 11

The ith bit add propagates a carry bit from the (ith−1) bit add if at least one of the bits of the ith bit add is a logic one. This requirement may be mathematically expressed as a local propagate function, $P_i$:

$P_i = A_i + B_i$ Eq. 12

Equations 11 and 12 are "local" because they are generated for each bit add within a four-bit adder cell.

Carry bit equations 6 through 9 may then be transformed by the local generate and propagate functions:

$C_1 = G_0 + P_0 C_0$ Eq. 13
$C_2 = G_1 + P_1 G_0 + P_1 P_0 C_0$ Eq. 14
$C_3 = G_2 + P_2 G_1 + P_2 P_1 G_0 + P_2 P_1 P_0 C_0$ Eq. 15
$C_4 = G_3 + P_3 G_2 + P_3 P_2 G_1 + P_3 P_2 P_1 G_0 + P_3 P_2 P_1 P_0 C_0$ Eq. 16 in general, $C_{i+1} = G_i + P_i G_{i-1} + P_i P_{i-1} G_{i-2} \ldots + P_i P_{i-1} \ldots P_0 C_0$ Eq. 17

Equation 17 indicates that any carry bit, and hence the location of the tail pointer, may be determined within two gate delays. Equation 17 may be simply used to generate the remaining eight carry bits if desired.

b. Modularity

The approach of fully expanding Equation 17 to generate twelve carry bits, however, is limited by the problems of fan-in and modularity. The problem of fan-in arises because the (nth+1) carry bit of an n-bit adder requires a circuit capable of logically OR'ing (n+1) inputs. Though this requirement may only be awkward for a twelve bit adder, it is impossible for larger adders. The problem of modularity arises because it is undesirable to design a different adder for each different adder size. As a consequence of the problems of fan-in and modularity, most carry look ahead adders are designed as multi-layered carry look ahead adders. A multi-layered design incorporates several functional levels of logic. Each layer of logic is itself made up of several pieces. Each piece generates a portion of a signal that would ordinarily be too difficult to produce with a single gate. Each piece within a layer is identical to every other piece. Also, them is significant similarity of pieces in different layers. This solution minimizes both the problems of fan-in and modularity while imposing only a small time penalty.

To implement a multi-layered adder, the same analysis is made of the output of each four-bit adder cell as was made of the output of each bit add above. A four-bit adder cell generates a carry bit if either (1) the four-bit adder cell generates a carry bit itself or (2) the four-bit adder cell propagates a carry bit from the previous four-bit adder cell. Both of these conditions may be extracted from Equation 16. The group generate function, G', may be defined to express the former condition. The group propagate function, P', may be defined to express the latter condition:

$G' = G_3 + P_3 G_2 + P_3 P_2 G_1 + P_3 P_2 P_1 G_0$ Eq. 18
$P' = P_3 P_2 P_1 P_0$ Eq. 19

Equations 18 and 19 are "group" functions because they are generated for each cell.

Generator 110 receives three sets of group generate and group propagate signals from the three four-bit adder cells 104, 106 and 108 and generates three carry bits, $C_4$, $C_8$ and $C_{12}$. Generator 110 also receives the carry bit input $C_0$. As depicted, the input $C_0$ is connected to the output $C_{12}$. This connection allows adder 90 to function as a circular register file. Without it, the tail pointer would not be able to move from the last entry of history buffer 12 to the first entry of history buffer 12 when appropriate.

As described above, each four-bit adder cell generates three carry bits. These carry bits, when taken with the carry bits of the other four-bit adder cells, make up nine of the twelve carry bits corresponding to a twelve bit adder. The remaining three carry bits, $C_4$, $C_8$ and $C_{12}$, may be determined in terms of the group generate function, group propagate function and the input carry bit, $C_0$:

$C_4 = G'_0 + P'_0 C_0$ Eq. 21
$C_8 = G'_1 + P'_1 G'_0 + P'_1 P'_0 C_0$ Eq. 22
$C_{12} = G'_2 + P'_2 G'_1 + P'_2 P'_1 G'_0 + P'_2 P'_1 P'_0 C_0$ Eq. 23

The subscripts attached to the group generate and group propagate functions refer to the four-bit adder that generated each. As depicted in FIG. 14, four-bit adder cell 104 generates the "zeroth" group function, four-bit adder cell 106 generates the first group functions and four-bit adder cell 108 generates the second group functions.

If necessary, generator 110 may generate a second-layer group generate function and a second-layer group propagate function in terms of the group generate function and the group propagate function. These second-layer functions are identical to Equations 18 and 19 with the substitution of the group generate and group propagate functions for the local generate and local propagate functions. The second-layer functions are necessary if more than sixteen bit adds are desired, given the depicted four-bit modularity. The second-layer functions would drive a second-layer generator that is functionally equivalent to generator 110. A second-layer generator allows an adder to add two data words each up to 64 bits in size, given the depicted four-bit modularity.

For instance, a thirty-two bit adder, corresponding to a thirty-two entry history buffer, requires eight four-bit adder cells. Each four-bit adder cell generates three carry bits, a group generate function and a group propagate function. The group generate and group propagate functions from the first four of the four-bit adder cells drive a first generator. The remaining four four-bit adder cells drive a second generator. The first generator generates three carry bits corresponding to the fourth, eighth and twelfth bit adds, a group generate function and a group propagate function. The second generator also generates three carry bits corresponding to the twentieth, twenty-fourth and twenty-eighth bit adds, a group generate function and a group propagate function. The second-layer group generate and second-layer group propagate functions from both of the two generators drive a single second-layer generator. The second-layer generator need only generate two carry bits corresponding to the sixteenth and thirty-second bit adds.

c. Four-Bit Adder Cells

Figure 15:
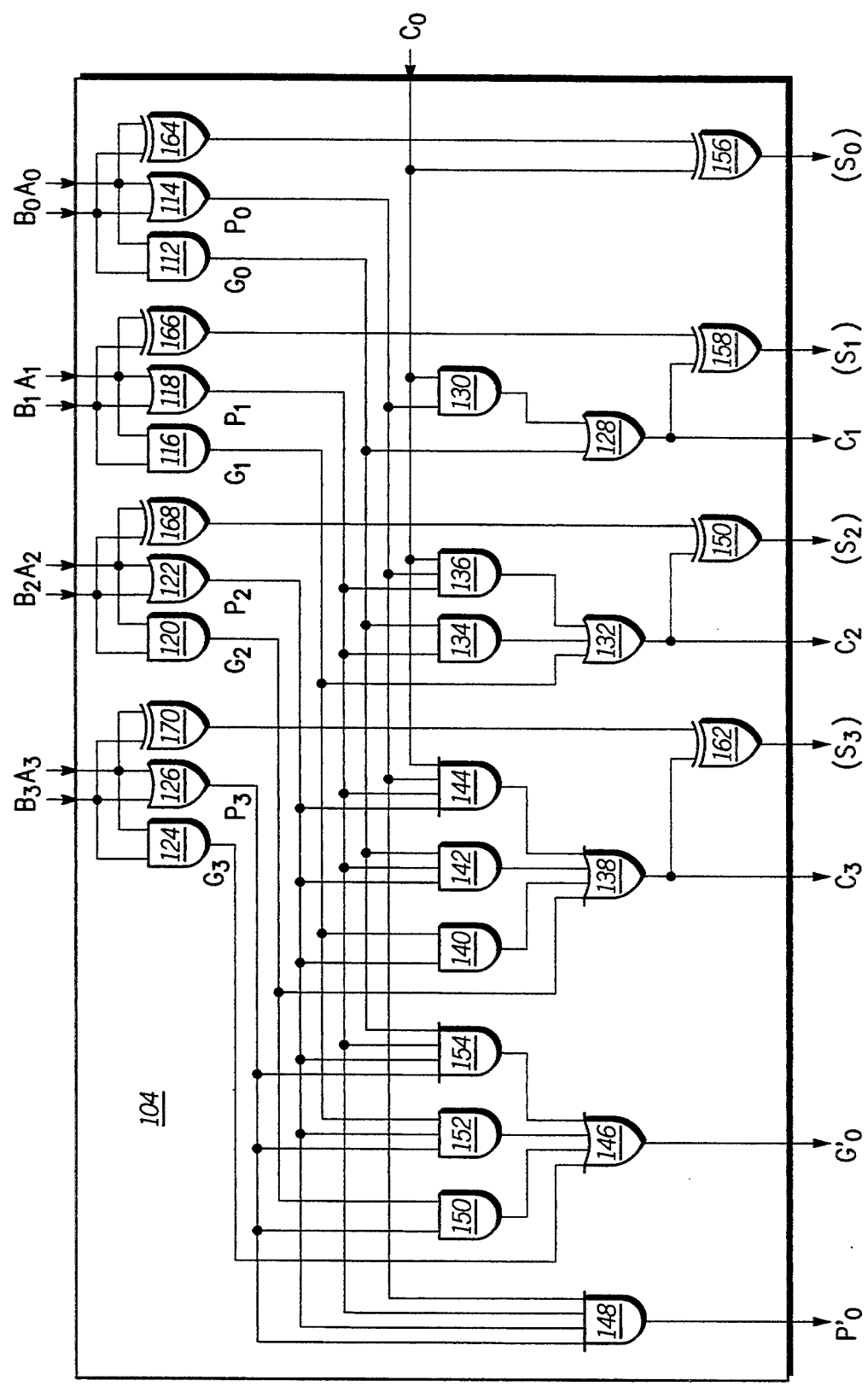
FIG. 15 depicts a logic diagram of the four bit adder cell illustrated in FIG. 14.

FIG. 15 depicts a logic diagram of four-bit adder cell 104 illustrated in FIG. 14. A two-input AND gate 112 and a two-input OR gate 114 generate the local generate and local propagate functions from and for the first bit add, $G_0$ and $P_0$, respectively. A two-input AND gate 116 and a two-input OR gate 118 generate the local generate and local propagate functions from and for the second bit add, $G_1$ and $P_1$, respectively. A two-input AND gate 120 and a two-input OR gate 122 generate the local generate and local propagate functions from and for the third bit add, $G_2$ and $P_2$, respectively. A two-input AND gate 124 and a two-input OR gate 126 generate the local generate and local propagate functions from and for the fourth bit add, $G_3$ and $P_3$, respectively.

A two-input OR gate 128 generates the first carry bit, $C_1$. OR gate 128 receives the output of AND gate 112 ($G_0$) and the output of a two-input AND gate 130 as inputs. AND gate 130 receives the output of OR gate 114 ($P_0$) and the input carry bit, $C_0$, as inputs.

A three-input OR gate 132 generates the second carry bit, $C_2$. OR gate 132 receives the output of AND gate 116 ($G_1$), the output of a two-input AND gate 134 and the output of a three-input AND gate 136 as inputs. AND gate 134 receives the output of OR gate 118 ($P_1$) and the output of AND gate 112 ($G_0$) as inputs. AND gate 136 receives the output of OR gate 118 ($P_1$), the output of OR gate 114 ($P_0$) and the input carry bit, $C_0$, as inputs.

A four-input OR gate 138 generates the third carry bit, $C_3$. OR gate 138 receives the output of AND gate 120 ($G_2$), the output of a two-input AND gate 140, the output of a three-input AND gate 142 and the output of a four-input AND gate 144 as inputs. AND gate 140 receives the output of OR gate 122 ($P_2$) and the output of AND gate 116 ($G_1$) as inputs. AND gate 142 receives the output of OR gate 122 ($P_2$), the output of OR gate 118 ($P_1$) and the output of AND gate 112 ($G_0$) as inputs. AND gate 144 receives the output of OR gate 122 ($P_2$), the output of OR gate 118 ($P_1$), the output of OR gate 114 ($P_0$) and the input carry bit, $C_0$, as inputs.

Four-input OR gate 146 and the four-input AND gate 148 generate the group generate and group propagate functions, $G'_0$ and $P'_0$, respectively. OR gate 146 receives the output of AND gate 124 ($G_3$), the output of a two-input AND gate 150, the output of a three-input AND gate 152 and the output of a four-input AND gate 154 as inputs. AND gate 150 receives the output of OR gate 126 ($P_3$) and the output of AND gate 120 ($G_2$) as inputs. AND gate 152 receives the output of OR gate 126 ($P_3$), the output of OR gate 122 ($P_2$) and the output of AND gate 116 ($G_1$) as inputs. AND gate 154 receives the output of OR gate 126 ($P_3$), the output of OR gate 122 ($P_2$), the output of OR gate 118 ($P_1$) and the input carry bit, $C_0$, as inputs. AND gate 148 has the output of OR gate 126 ($P_3$), the output of OR gate 122 ($P_2$), the output of OR gate 118 ($P_1$) and the output of OR gate 114 ($P_0$) as inputs.

Although not necessary to the present invention, the sum bits $S_0$, $S_1$, $S_2$ and $S_3$ may be generated by XOR gates 156, 158, 160 and 162, respectively. XOR gate 156 has the output of an XOR gate 164 and the input carry bit, $C_0$, as inputs. XOR gate 164 has $A_0$ and $B_0$ as inputs. XOR gate 158 has the output of an XOR gate 166 and the first carry bit, $C_1$, as inputs. XOR gate 166 has $A_1$ and $B_1$ as inputs. XOR gate 160 has the output of an XOR gate 168 and the second carry bit, $C_2$, as inputs. XOR gate 168 has $A_2$ and $B_2$ as inputs. XOR gate 162 has the output of an XOR gate 170 and the third carry bit, $C_3$, as inputs. XOR gate 170 has $A_3$ and $B_3$ as inputs.

d. Generator

Figure 16:
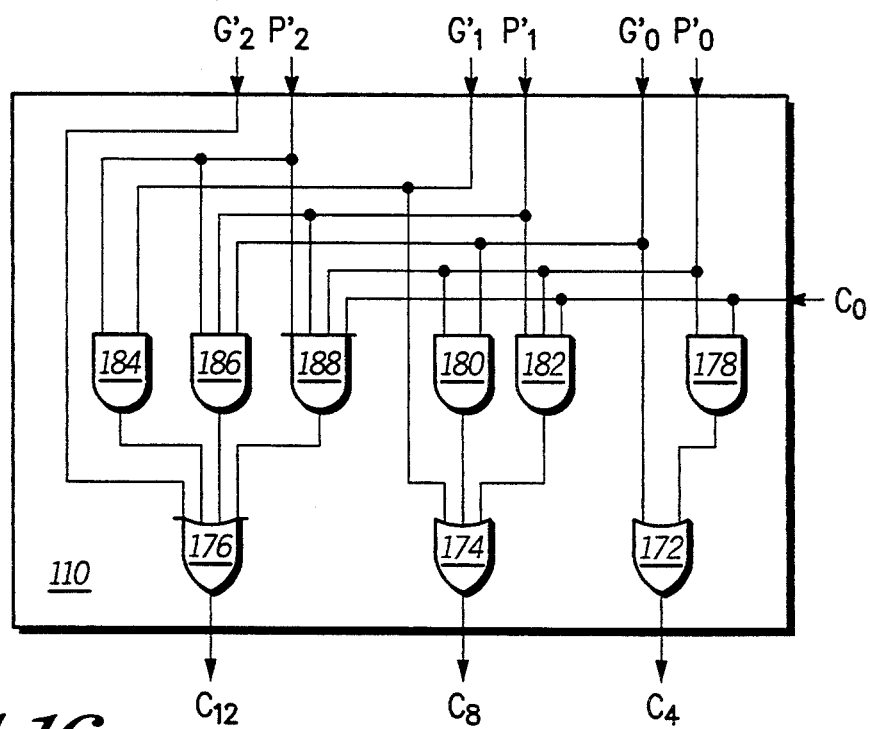
FIG. 16 depicts a logic diagram of the three-group carry look ahead generator illustrated in FIG. 14.

FIG. 16 depicts a logic diagram of generator 110 illustrated in FIG. 14. OR gates 172, 174 and 176 generate the fourth, eighth and twelfth carry bits, respectively.

Two-input OR gate 172 receives the "zeroth" group generate function, $G'_0$, and the output of a two-input AND gate 178 as inputs. AND gate 178 receives the "zeroth" group propagate function, $P'_0$, and the input carry bit, $C_0$, as inputs.

Three-input OR gate 174 receives the first group generate function, $G'_1$, the output of a two-input AND gate 180 and the output of a three-input AND gate 182 as inputs. AND gate 180 receives the "zeroth" group generate function, $G'_0$, and the "zeroth" group propagate function, $P'_0$, as inputs. AND gate 182 receives the first group propagate function, $P'_1$, the "zeroth" group propagate function, $P'_0$, and the input carry bit, $C_0$, as inputs.

Four-input OR gate 176 receives the second group generate function, $G'_2$, the output of a two-input AND gate 184, the output of a three-input AND gate 186 and the output of a four-input AND gate 188 as inputs. AND gate 184 receives the second group propagate function, $P'_2$, and the first group generate function, $G'_1$, as inputs. AND gate 186 receives the second group propagate function, $P'_2$, the first group propagate function, $P'_1$, and the "zeroth" group generate function, $G'_0$, as inputs. AND gate 188 receives the second group propagate function, $P'_2$, the first group propagate function, $P'_1$, the "zeroth" group propagate function, $P'_0$, and the input carry bit, $C_0$, as inputs.

3. Detector

Figure 17:
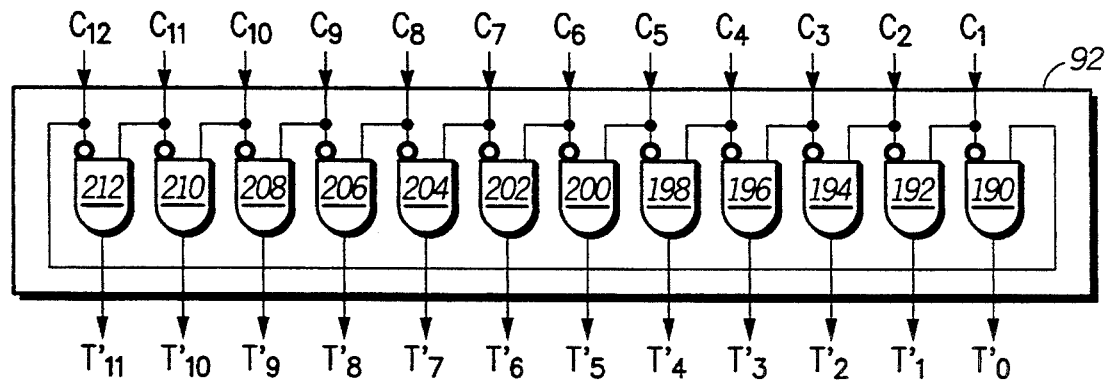
FIG. 17 depicts a logic diagram of the zero-to-one transition detector illustrated in FIG. 12.

FIG. 17 depicts a logic diagram of detector 92 illustrated in FIG. 12. Detector 92 has twelve AND gates 190, 192, 194, 196, 198, 200, 202, 204, 206, 208, 210 and 212. AND gate 190 receives the signal $C_{12}$ and the inverse of the signal $C_1$ and generates the output $T'_0$. AND gate 192 receives the signal $C_1$ and the inverse of the signal $C_2$ and generates the output $T'_1$. AND gate 194 receives the signal $C_2$ and the inverse of the signal $C_3$ and generates the output $T'_2$. AND gate 196 receives the signal $C_3$ and the inverse of the signal $C_4$ and generates the output $T'_3$. AND gate 198 receives the signal $C_4$ and the inverse of the signal $C_5$ and generates the output $T'_4$. AND gate 200 receives the signal $C_5$ and the inverse of the signal $C_6$ and generates the output $T'_5$. AND gate 202 receives the signal $C_6$ and the inverse of the signal $C_7$ and generates the output $T'_6$. AND gate 204 receives the signal $C_7$ and the inverse of the signal $C_8$ and generates the output $T'_7$. AND gate 206 receives the signal $C_8$ and the inverse of the signal $C_9$ and generates the output $T'_8$. AND gate 208 receives the signal $C_9$ and the inverse of the signal $C_{10}$ and generates the output $T'_9$. AND gate 210 receives the signal $C_{10}$ and the inverse of the signal $C_{11}$ and generates the output $T'_{10}$. AND gate 212 receives the signal $C_{11}$ and the inverse of the signal $C_{12}$ and generates the output $T'_{11}$.

C. Buffer Pointer Operation

Figure 18:
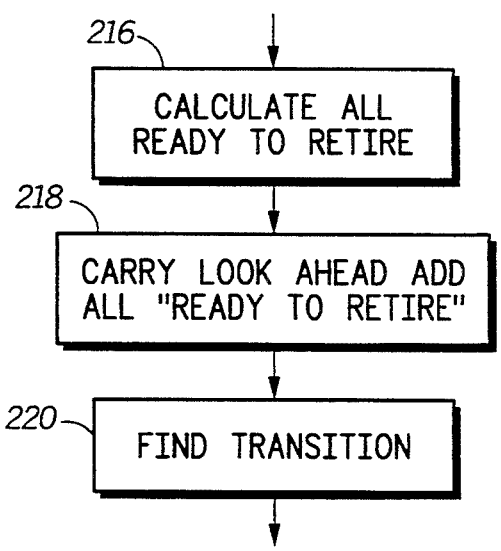
FIG. 18 depicts a flow chart of one set of steps operable to increment a buffer pointer.

FIG. 18 depicts a flow chart 214 of one set of steps operable to increment the disclosed buffer pointer. In the absence of an interrupt, exception or incorrect speculative instruction, controller 14 performs the steps depicted in FIG. 11 each clock cycle. Controller 14 begins flow chart 214 by determining which entries within history buffer 12 are ready-to-retire, step 216. As described above, an instruction is ready to retire after it completes successfully. Controller 14 then logically adds the ready-to-retire signals and the vector identifying the previous tail pointer position, step 218. As described above, the vector identifying the previous position of the tail pointer has twelve bits, of which, one and only one bit is high. By using a carry look ahead adder, controller 14 may increment the position of the tail pointer through its full range of possible positions in a relatively short period of time. Controller 14 determines the position of the tail pointer by locating the zero-to-one transition within the carry bits resulting from the carry look ahead add of step 218, step 220. Controller 14 continues processing at step 216 during the next clock cycle.

III. CONCLUDING REMARKS

The disclosed invention has numerous technical advantages. The disclosed buffer is suitable for use with systems which require high speed performance. The pointer may also be designed in modules. A modular design procedure makes the pointer easily adapted for applications with different size buffers while maintaining the pointer's high speed performance.

Although the present invention has been described with reference to a specific embodiment, further modifications and improvements will occur to those skilled in the art. For instance, the disclosed pointer may also act as a head pointer. In addition, the disclosed invention may be practiced in applications other than in a history or reorder buffer. It is to be understood therefore, that the invention encompasses all such modifications that do not depart from the spirit and scope of the invention as defined in the appended claims.

What is claimed is:

1. A pointer for use with a buffer, the pointer operable to designate one of a plurality of entries of the buffer responsive to input data and responsive to a prior designated entry, the pointer comprising:

generate circuitry for receiving a first and a second data word, said first and second data words each comprising a plurality of data bits, one bit of each first and second data word corresponding to one of the entries of the buffer, a logic state of each data bit of the first data word representative of the eligibility of said pointer to designate an entry, said second data word representative of the pointer location at a previous time, said generate circuitry generating a plurality of local generate functions, each local generate function corresponding to one of the entries of the buffer;

propagate circuitry for receiving said first and second data words, said propagate circuitry generating a plurality of local propagate functions, each local propagate function corresponding to one of said entries of said buffer;

carry circuitry coupled to said generate circuitry and to said propagate circuitry, said carry circuitry generating a plurality of carry bits, a first one of said plurality of carry bits being a function of an input carry bit, one of said plurality of local generate functions, and one of said plurality of local propagate functions, a second one of said plurality of carry bits being a function of another of said plurality of carry bits, another of said plurality of local generate functions, and another of said plurality of local propagate functions, each carry bit corresponding to one of the entries of said buffer; and detector circuitry coupled to said carry circuitry, said carry circuitry for receiving said plurality of carry bits, said detector circuitry detecting a predetermined pattern within said plurality of carry bits, an output of said detector circuitry coupled to said second data word, a position of said predetermined pattern identifying a subsequent position of said pointer location.

2. The pointer of claim 1 further comprising first data word generator receiving a plurality of data sets, each data set corresponding to one entry of said buffer, said first data word generator generating said first data word.

3. The data processor of claim 1 wherein said detector circuitry further comprises circuitry detecting a zero logic level adjacent to a one logic level within said plurality of carry bits.

4. The pointer of claim 3 wherein said carry circuitry further comprises circuitry for coupling one of said plurality of carry bits to said input carry bit.

5. The pointer of claim 4 further comprising latching circuitry for receiving said output of said detector circuitry, said latching circuitry storing said output of the detector circuitry, said output of the detector circuitry coupled to said second data word.

6. The pointer of claim 1 wherein said carry circuitry further comprises circuitry for coupling one of said plurality of carry bits to said input carry bit.

7. The pointer of claim 6 further comprising latching circuitry for receiving said output of said detector circuitry, said latching circuitry storing said output of said detector circuitry, said output of the detector circuitry coupled to said second data word.

8. The pointer of claim 1 further comprising latching circuitry for receiving said output of the detector circuitry, said latching circuitry storing said output of said detector circuitry, the output of said detector circuitry coupled to said second data word.

9. A method of incrementing a pointer, the pointer designating one of a plurality of entries of a buffer, each entry comprising a first data bit associated with the entry, the data bit representative of the eligibility of the associated entry to be designated, the method comprising the steps of:

generating a plurality of local generate functions, each of said local generate functions receiving two input bits, said first input bit coupled to one of said first data bits, the second input bit coupled to one bit of a plurality of second input bits, a logic state of each one of said plurality of first input bits representative of the eligibility of a pointer to designate an entry, said plurality of second input bits representative of said pointer location at a previous time, each of said plurality of local generate functions corresponding to one of said entries of said buffer;

generating a plurality of local propagate functions, each of said plurality of local propagate functions receiving two input bits, said first input bit coupled to one of said first data bits, the second input bit coupled to one bit of said plurality of second input bits, each of said plurality of local propagate function corresponding to one of said entries of said buffer;

generating a plurality of carry bits, each one of said plurality of carry bits corresponding to one of said entries of said buffer, a first one of said plurality of carry bits being a function of an input carry bit, one of said plurality of local generate functions, and one of said plurality of local propagate functions, a second one of said plurality of carry bits being a function of another of said plurality of carry bits, another of said plurality of local generate functions, and another of said plurality of local propagate functions; and detecting a predetermined pattern within said plurality of carry bits, a position of said predetermined pattern identifying a subsequent position of said pointer.

10. The method of claim 9 wherein said step of detecting further comprises the step of detecting a zero to one transition within said plurality of carry bits.

11. The method of claim 10 wherein said step of generating a plurality of carry bits further comprises the step of coupling said input carry bit to another of said plurality of carry bits.

12. The method of claim 11 further comprising the step of latching said position of said predetermined pattern.

13. The method of claim 9 wherein said step of generating a plurality of carry bits further comprises the step of coupling said input carry bit to another of said plurality of carry bits.

14. The method of claim 13 further comprising the step of latching said position of said predetermined pattern.

15. The method of claim 9 further comprising the step of latching said position of said predetermined pattern.

* * * * *